(12) United States Patent
Alexandroff

(10) Patent No.: US 12,741,722 B2
(45) **Date of Patent: *Sep. 22, 2026**

(54) SUPPORT SYSTEM HAVING SHAPED PILE-ANCHOR FOUNDATIONS AND A METHOD OF FORMING SAME

(71) Applicant: Sharp Pulse Corp., New York, NY (US)

(72) Inventor: Igor Simon Alexandroff, New York, NY (US)

(73) Assignee: Sharp Pulse Corp., New York, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 18/571,236

(22) PCT Filed: Dec. 30, 2021

(86) PCT No.: PCT/US2021/065781

§ 371 (c)(1),
(2) Date: Dec. 17, 2023

(87) PCT Pub. No.: WO2022/265674

PCT Pub. Date: Dec. 22, 2022

(65) Prior Publication Data

US 2024/0351667 A1 Oct. 24, 2024

Related U.S. Application Data

(63) Continuation of application No. 17/350,982, filed on Jun. 17, 2021, now Pat. No. 11,203,400.

(51) Int. Cl.

| | |
|---|---|
| ***E02D 7/00*** | (2006.01) |
| ***B63B 35/44*** | (2006.01) |
| ***F03D 13/25*** | (2016.01) |

(52) U.S. Cl.

CPC ............. *B63B 35/44* (2013.01); *F03D 13/25* (2016.05); *B63B 2035/446* (2013.01); *F05B 2240/95* (2013.01)

(58) Field of Classification Search

CPC .... E02D 5/44; E02D 5/22; E02D 5/34; E02D 11/00; E02D 7/00; E02D 5/38; E02D 5/40

(Continued)

(56) References Cited

U.S. PATENT DOCUMENTS

| | | | |
|---|---|---|---|
| 890,765 | A | 6/1908 | Gilbreth |
| 1,978,332 | A | 10/1934 | Stern |

(Continued)

FOREIGN PATENT DOCUMENTS

| | | |
|---|---|---|
| EA | 024019 B1 | 8/2016 |
| EP | 2702209 A2 | 3/2014 |

(Continued)

OTHER PUBLICATIONS

"A Firm Footing", Delta Drilling Company, https://www.bkdelta.by/en/articles/firm-footing, 2019, 2 pages.

(Continued)

*Primary Examiner* — Sean D Andrish
(74) *Attorney, Agent, or Firm* — Koffsky Schwalb LLC

(57) ABSTRACT

Foundation systems and methods using in-situ shaped pile-anchors that are particularly adapted for use in aquatic environments. The shaped pile-anchor of the invented foundation includes a concrete filled tubular metal casing, the bottom end of which is positioned at a predetermined depth in the ground (e.g., aquatic-floor soil) and the top end of (Continued)

which protrudes above the water or soil surface. Concrete fills the inside the metal casing, substantially all the way to the top end of the casing, forming an upper portion of a concrete column. The lower portion of the concrete column extends down below the bottom end of the metal casing and further into the ground. The lower portion is shaped to have a cross-section greater than the cross-section of the upper portion, which equals to the inner diameter of the tubular metal casing. A platform is coupled to one of more of the shaped pile-anchors to support a structure above.

16 Claims, 14 Drawing Sheets

(58) Field of Classification Search
USPC .......................................................... 405/237
See application file for complete search history.

(56) References Cited

U.S. PATENT DOCUMENTS

| | | | |
|---|---|---|---|
| 2,438,729 A | 3/1948 | Upson | |
| 3,324,665 A | 6/1967 | Robichaux | |
| 3,553,969 A | 1/1971 | Chamberlin | |
| 3,628,146 A | 12/1971 | Beckman | |
| 3,679,007 A | 7/1972 | O'Hare | |
| 3,685,302 A | 8/1972 | Fuller | |
| 3,763,610 A | 10/1973 | Ballew | |
| 3,896,917 A | 7/1975 | Taplin | |
| 4,060,994 A | 12/1977 | Chitis | |
| 4,074,758 A | 2/1978 | Scott | |
| 4,169,503 A | 10/1979 | Scott | |
| 4,222,684 A | 9/1980 | Rosenstock | |
| 4,230,425 A * | 10/1980 | Gusev | E02D 5/385 405/239 |
| 4,268,192 A | 5/1981 | Colle | |
| 4,345,650 A | 8/1982 | Wesley | |
| 4,465,401 A | 8/1984 | Stoddord | |
| 4,479,680 A | 10/1984 | Wesley | |
| 4,653,697 A | 3/1987 | Codina | |
| 4,741,405 A | 5/1988 | Moeny | |
| 4,806,153 A | 2/1989 | Sakai | |
| 5,004,050 A | 4/1991 | Sizonenko | |
| 5,106,164 A | 4/1992 | Kitzinger | |
| 5,301,169 A | 4/1994 | Baria | |
| 5,388,521 A | 2/1995 | Coursen | |
| 5,397,961 A | 3/1995 | Ayers | |
| 5,416,391 A | 5/1995 | Correa | |
| 5,425,570 A | 6/1995 | Wilkinson | |
| 5,482,357 A | 1/1996 | Wint | |
| 5,573,307 A | 11/1996 | Wilkinson | |
| 5,773,750 A | 6/1998 | Jae | |
| 5,980,446 A | 11/1999 | Loomis | |
| 6,012,874 A | 1/2000 | Groneck | |
| 6,227,293 B1 | 5/2001 | Huffman | |
| 6,283,555 B1 | 9/2001 | Arai | |
| 6,457,778 B1 | 10/2002 | Chung | |
| 6,490,527 B1 | 12/2002 | Utt | |
| 6,499,536 B1 | 12/2002 | Ellingsen | |
| 6,597,632 B2 | 7/2003 | Khan | |
| 6,761,416 B2 | 7/2004 | Moeny | |
| 6,772,105 B1 | 8/2004 | Heck, Sr. | |
| 6,935,702 B2 | 8/2005 | Okazaki | |
| 7,533,505 B2 | 5/2009 | Henderson | |
| 7,562,740 B2 | 7/2009 | Ounadjela | |
| 7,618,217 B2 | 11/2009 | Henderson | |
| 7,849,919 B2 | 12/2010 | Wood | |
| 8,616,302 B2 | 12/2013 | Moeny | |
| 8,628,146 B2 | 1/2014 | Baltazar-Lopez | |
| 8,789,772 B2 | 7/2014 | Moeny | |
| 9,181,788 B2 | 11/2015 | Ageev | |
| 9,512,589 B1 | 12/2016 | Van Polen | |
| 9,719,302 B2 | 8/2017 | Linyaev | |
| 9,739,574 B1 | 8/2017 | Vijay | |
| 9,770,724 B2 | 9/2017 | Vijay | |
| 9,816,356 B2 | 11/2017 | Ageev | |
| 9,828,739 B2 | 11/2017 | Davidow | |
| 9,896,917 B2 | 2/2018 | Sizonenko | |
| 10,060,195 B2 | 8/2018 | Moeny | |
| 10,254,499 B1 | 4/2019 | Cohen | |
| 10,280,723 B2 | 5/2019 | Ageev | |
| 10,407,995 B2 | 9/2019 | Moeny | |
| 10,577,767 B2 | 3/2020 | Magnotti | |
| 11,203,400 B1 | 12/2021 | Alexandroff | |
| 11,427,288 B1 | 8/2022 | Alexandroff | |
| 2001/0011590 A1 | 8/2001 | Thomas | |
| 2006/0038437 A1 | 2/2006 | Moeny | |
| 2007/0292215 A1 | 12/2007 | Kim | |
| 2010/0270038 A1 | 10/2010 | Looney | |
| 2011/0139441 A1 | 6/2011 | Zolezzi Garreton | |
| 2011/0227395 A1 | 9/2011 | Baltazar-Lopez | |
| 2012/0043075 A1 | 2/2012 | Abramova | |
| 2014/0027110 A1 | 1/2014 | Ageev | |
| 2014/0251599 A1 | 9/2014 | Linetskiy | |
| 2016/0168815 A1 | 6/2016 | Kemp | |
| 2017/0002535 A1 | 1/2017 | Surjaatmadja | |
| 2018/0170488 A1 | 6/2018 | Fernandez Gomez | |
| 2019/0177944 A1 | 6/2019 | Magnotti | |

FOREIGN PATENT DOCUMENTS

| | | | |
|---|---|---|---|
| FR | 2452551 | A1 | 10/1980 |
| RU | 2144980 | C1 | 1/2000 |
| RU | 2184221 | C1 | 6/2002 |
| RU | 2194846 | C2 | 12/2002 |
| RU | 2199659 | C1 | 2/2003 |
| RU | 2213860 | C2 | 10/2003 |
| RU | 2261986 | C1 | 10/2005 |
| RU | 2272128 | C1 | 3/2006 |
| RU | 2282021 | C2 | 8/2006 |
| RU | 2283950 | C2 | 9/2006 |
| RU | 2295031 | C2 | 3/2007 |
| RU | 2298641 | C2 | 5/2007 |
| RU | 2298642 | C1 | 5/2007 |
| RU | 2314412 | C1 | 1/2008 |
| RU | 2317409 | C1 | 2/2008 |
| RU | 2327027 | C2 | 6/2008 |
| RU | 2007101698 | A | 7/2008 |
| RU | 2335658 | C2 | 10/2008 |
| RU | 2520672 | C2 | 6/2014 |
| WO | 2012146350 | A2 | 11/2012 |
| WO | 2012146350 | A3 | 12/2012 |

OTHER PUBLICATIONS

"Bored piles with widening", https://translate.googleusercontent.com/translate_f, printed Oct. 21, 2021, published prior to Jun. 2020, 19 pages.
"Delta Bored piles by vibration immersion of casing pipe", https://translate.googleusercontent.com/translate_f, printed Oct. 21, 2021, published prior to Jun. 2020, 15 pages.
"Developing and Constructing Wind Energy", we-energies.com, 2019, 32 pages.
"Expanded-Base Piles Driven pile got a decent alternative", Delta Drilling Company, 2016, 5 pages.
"Modern technologies of construction of bored piles", https://translate.googleusercontent.com/translate_f, printed Oct. 21, 2021, published prior to Jun. 2020, 25 pages.
"Soil testing with bored piles", https://translate.googleusercontent.com/translate_f, printed Oct. 21, 2021, published prior to Jun. 2020, 13 pages.
"Technical Report on soil testing with bored and driven piles", https://translate.googleusercontent.com/translate_f, printed Oct. 21, 2021, published 2016, 41 pages.
"Anholt Offshore Wind Farm," DONG Energy, Posted on YouTube on Jan. 22, 2014, (site visited Jul. 5, 2021), Available from Internet URL: <https://www.youtube.com/watch?v=FiMC5815ve8> at approximately 6:57 (1 page).
"Electric Discharge Piles up to 600mm Diameter," Delta Drilling Company, Posted on YouTube Nov. 11, 2016, (site visited Jul. 5,

(56) References Cited

OTHER PUBLICATIONS

2021), Available from Internet URL: <https://www.youtube.com/watch?v=YIxT8aJTxFk> at approximately 2:44 (1 page).

"Monopile Installation—Sandbank Offshore Wind Farm," DONG Energy, Posted on YouTube Jul. 8, 2019, (site visited Jul. 5, 2021), Available from Internet URL: <https://www.youtube.com/watch?v=D5Dbt6ZX_uY> at approximately 1:43 (1 page).

"Technique Expanded-Base Pile Vibratory Method with Sacrificial Tip," Delta Drilling Company, Posted on YouTube on Jun. 2, 2016, (site visited Jul. 5, 2021), Available from Internet URL: <https://www.youtube.com/watch?v=d0RfYsgxvPc> at approximately 1:46 (1 page).

"WFO Webinar: Offshore Wind Installation Challenges," World Forum Offshore Wind, Posted on Oct. 29, 2020 (site visited Jul. 5, 2021), Available from Internet URL: <https://www.youtube.com/watch?v=MHFqLWvc_aA> at approximately 40:34 (1 page).

" "Сваи и анкера по принципу ' 'Гармошка'," Буровая ', " Компания ДЕЛЬТА, , Posted on YouTube Sep. 19, 2016, (site visited Jul. 5, 2021), Available from Internet URL: <https://www.youtube.com/watch?v=O_1py3KQoCY> at approximately 0:53 (1 page).

Ashlock et al., "Foundations for Wind Turbines Engr 340—Fall 2011", 2011, 36 pages.

Eremin et al., "Deformability of sandy soils in the manufacture of piles along discharge-pulse technology (RIT)", https://translate.googleusercontent.com/translate_f, printed Oct. 21, 2021, published prior to Jun. 2020, 30 pages.

Eremin, "Experience of using bored piles-RHS in difficult ground conditions", https://translate.googleusercontent.com/translate_f, printed Oct. 21, 2021, published 2012, 50 pages.

Eric P. Koehler, Ph.D., "Thixotropy of SCC and Its Effects on Formwork Pressure", ACI Spring 2013 Convention, Apr. 14, 2013, 26 pages.

Horwath et al., "Comparison of Environmental Effects from Different Offshore Wind Turbine Foundations", OCS Study BOEM 2020-041, U.S. Department of the Interior Bureau of Ocean Energy Management Office of Renewable Energy Programs, Aug. 2020, 53 pages.

https://www.thefreedictionary.com/about.

International Search Report and Written Opinion issued in App. No. PCT/US2021/065781, mailing date May 4, 2022, 16 pages.

Kubetskiy et al., "Construction of the foundations of increased buildings floors in Moscow using sweet-rit", https://translate.googleusercontent.com/translate_f, printed Oct. 21, 2021, published prior to Jun. 2020, 36 pages.

Mangushev et al., "Bored piles with widening-A", https://translate.googleusercontent.com/translate_f, printed Oct. 21, 2021, published prior to Jun. 2020, 30 pages.

PCT Invitation to Pay Additional Fees and, Where Applicable, Protest Fee issued for App. No. PCT/US2021/065781, dated Feb. 25, 2022, 2 pages.

Shelton L. Stringer, "P & H Foundation Systems", 2011 Earth Systems Global Inc., 14 pages.

Extended European Search Report issued in App. No. EP24157971, dated Apr. 4, 2024, 14 pages.

* cited by examiner

SUPPORT SYSTEM HAVING SHAPED PILE-ANCHOR FOUNDATIONS AND A METHOD OF FORMING SAME

This application claims the benefit of U.S. application Ser. No. 17/350,982 which was filed on Jun. 17, 2021, and which is incorporated herein by reference in its entirety.

FIELD OF THE INVENTION

This invention relates to a field of structural foundations and anchoring. More particularly, the invention related to a field of structural foundations and anchoring utilizing shaped pile-anchors. The invention is particularly useful for providing shaped pile-anchor foundations and anchoring in aquatic (off-shore) environments.

BACKGROUND OF THE INVENTION

Foundations are designed to carry structures placed above them, such as buildings, tall towers (e.g., windmills, electric towers), bridges, etc. Foundations generally use concrete piles that extend into the ground and transfer loads down to the underlying soil, to prevent movement from forces that might be exerted against them, either directly or indirectly. i.e., through the structures carried above them and transferred to the piles. For example, such structures as wind turbines can produce vertical forces in the of 1,000-tonnes range and horizontal forces in 600-tonnes range. Depending on the forces and surrounding conditions, the diameter and length of the piles can vary.

Generally, the larger the forces exerted against a pile, the greater its diameter and its penetration into the ground. Heavy and deep foundations are required whenever weak soils have little capacity to resist existing loads.

In constructing foundations, designers take into consideration several different factors, such as the structures themselves and their environment. For example, when it comes to structures, designers may consider their dimensions (e.g., height, size, and weight). When it comes to the environment, designer may consider conditions under which both the structures and their foundations will operate. For example, the temperatures and dynamic forces (e.g., wind forces) expected to be encountered by the structures may impact the forces that will be transferred to the foundations and their piles. FIGS. 1(*a*) and 1(*b*) show examples of prior art foundations for wind turbines and the forces acting on their piles.

FIG. 1(*a*) illustrates a cross-sectional view of a wind-turbine structure 2 positioned on a platform 4 having a single pile (mono-pile) 6 that is located along the wind-turbine pole's axis. (Although the figure shows the platform as being located right on the ground 10, the platform could also be located at or right below ground.) The weight of the wind-turbine structure is shown as creating a gravitational downward force $F_G$ on the platform, which gets transferred down to the mono-pile 6. When a wind is blowing as shown in the figure, a horizontal force Fw acting against the wind-turbine structure gets transferred to the foundation as a rolling moment M that tries to overturn the overall structure. This, in turn, causes the mono-pile to push against the soil 10. For the mono-pile 6 to remain rigidly secured within the soil, however, the soil must apply a lateral bearing and bending resistance against the mono-pile. This lateral resistance can be viewed as a set of lateral forces $F_L$ acting along the length of the mono-pile. Reference numeral 12 designates a center-of-rotation of the mono-pile under the combined influence of applied forces. The position of this center depends on a soil density and strength distribution by the underground part of mono-pile length. With the rolling moment M acting as shown in FIG. 1(*a*), the lateral force at the center-of-rotation point, reference 12, is 0 pounds (0 lb). As one moves up the mono-pile above the center-of-rotation point 12, the lateral forces are directed from right to left and are gradually increasing, with the greatest leftward-directed force occurring at the soil surface. As one moves down the mono-pile below the center-of-rotation point 12, the lateral forces are directed from left to right and are gradually increasing, with the greatest rightward-directed force occurring at the bottom of the mono-pile 6. Thus, for such a foundation, a designer must consider the soil's maximum lateral bearing and bending resistance.

FIG. 1(*b*) provides a cross-sectional view a wind-turbine structure 2 positioned on a platform 18 having two piles 14 and 16 spaced symmetrically off-center with respect to the wind-turbine's pole 20. (Although the figure shows the platform as being located right on the ground 10, the platform could also be located at or right below ground.) The weight of the wind-turbine structure is shown as creating a gravitational downward force $F_G$ on the platform, which gets distributed down to the piles as components of the $F_G$ force, $F_{G1}$ through $F_{Gm}$, where "n" is the number of piles. The magnitude of each individual component of $F_{Gx}$, however, will depend not only on the number of piles but also on the relative positioning of the piles with respect to the point at which the gravitational $F_G$ force is applied against the platform. In FIG. 1(*b*), the two piles 16 and 14 are shown as carrying components $F_{G1}$ and $F_{G2}$, respectively, of the gravitational force $F_G$.

In addition, when the wind is blowing in the direction shown in FIG. 1(*b*), a horizontal force Fw acting against the wind-turbine structure creates a rolling moment M that ties to overturn the structure. The two piles in the figure, however, will experience the applied rolling moment M differently. Besides lateral forces applied to both piles similar to FIG. 1(*a*), which for simplicity are not shown on FIG. 1(*b*), the rolling moment M will create a downward force Fic on pile 14, causing it to be in compression. At the same time, the rolling moment M will create an upward force $F_{MT}$ on pile 16, causing it to be in less compression or even tension as a result of combination of two opposite directed forces—gravitation force and overturning one. Thus, for such a foundation, a designer need not only worry about the pile's and soil's weight bearing capacity (compression regime) but must also make sure that: a) the pile can handle the tension force, and b) friction between the soil and the pile will be sufficient to prevent the pile from being pulled out of the soil in case if gravitation compression force is lower than the overturning one.

Because off-shore (aquatic) environments present specific problems, whether a foundation is located on-shore vs. off-shore will also greatly impact foundation design. For example, in an aquatic environment, while a lower portion of a foundation's pile is in the aquatic-floor soil, the pile's upper portion extends above the soil and is exposed to the aquatic medium (either fresh or salt water). As a result, the overall forces acting on the foundation will be a combination of forces exerted by structure, the aquatic medium (waves, currents, etc.), and any soil movement. Therefore, to minimize movement of a foundation, the foundation designers should consider vertical, rotational, and horizontal forces that will be acting on the foundation. This is particularly important for aquatic-based foundations that support heavy and/or tall structures, such as bridges, wind turbines, electrical towers, signal towers, etc. Note, to avoid placing foundations into resonant conditions, the designers also consider the natural frequencies of the foundation in relation to the various variable forces.

Several prior art aquatic-based foundation options are shown in FIG. 2. For example, the option labeled "a) Gravity" shows a wind turbine structure 2 placed over a foundation that extends about 15 meters down into the water. The foundation has a form of a cone that rests on a flat plate buried right at the aquatic-floor surface. This type of foundation is referred to as a gravity type.

The option labeled "b) Monopile" illustrates a wind turbine structure 2 positioned over a monopile-type foundation. The monopile sits in about 27 meters of water (upper portion of the monopile) and penetrates down into the aquatic-floor another 27 meters (lower portion of the monopile). Thus, the upper-portion to lower-portion ratio is about 1:1.

The option labeled "c) Monopile with Guy Wires" is similar to the "b) Monopile" option, except that the vertical monopile is supplemented with guy wires for additional structural support. The guy-wires feature allows for 4:1 upper/lower monopile-portion ratio. In this option, the water depth is about 40 meters, with monopile penetrating the aquatic soil by another 10 meters. As a result, while having a shorter overall length, the "c) Monopile with Guy Wires" option allows structures, e.g., wind turbines, to be placed at offshore locations with greater water depths than the "b) Monopile" option.

The option labeled "d) Tripod" illustrates a tripod-type foundation that includes a monopile with three interconnected supports at the bottom. In this option, the monopile and each support penetrates the aquatic-floor soil by about 10 meters and, in addition to interconnecting with the other supports, also has a diagonal extension connecting to the monopile.

The option labeled "e) Braced Frame" illustrates a brace-frame type foundation. Here, a wind turbine structure 2 is connected to a braced-frame, which in turn is supported by four piles embedded in the aquatic-floor soil.

The option labeled "f) Tension Leg with Suction buckets" illustrates a foundation structure that includes tension legs that are connected by tension wires to suction buckets buried in the aquatic-floor soil. The other end of each tension leg appears to be connected to a buoy.

Finally, option labeled "g) Ballast Stabilized Buoy with Suction Anchor" shows a ballast stabilized buoy connected by a wire to a suction anchor that is buried in the aquatic-floor soil.

None of these prior art aquatic-environment foundations, however, include in-situ shaped piles-anchors that provide enhanced ability to withstand vertical, lateral, and/or rotational forces exerted against the foundation, thus increasing foundation's loading capacity, as well as having enhanced resistance to being pulled out of the soil in which they are located.

It is known to in-situ shape pile-anchors using hydroelectric immersed technology ("HIT") for on-shore applications. One such shaped anchor-shaping method for on-shore applications is disclosed in U.S. Pat. No. 10,577,767, which is incorporated herein by reference in its entirety. It is also known to in-situ shape pile-anchors via hydraulic forces and via explosives. These prior art anchor-shaping methods and anchor designs, however, have limitations that do not readily lend them to aquatic-based environments, where a substantial portion of the in-situ shaped anchor is formed and functions in an aquatic medium (either fresh water or salt water).

For example, prior art pile-anchors shaped using explosive materials have several limitations. First, it is difficult to create more than a single anchor shaping explosion, thus limiting one's ability to shape the pile-anchor. Second, the explosion profile itself is difficult to control. Third, explosive materials generate gases that must be removed from the bottom of the pile-anchor. As these gases are removed or escape to the surface through the pile-anchor's stack of wet concrete they may weaken the concrete material, thus weaking the overall pile-anchor structure. Fourth, using explosive materials is dangerous, and fifth—the resulting low-frequency vibrations generated by an explosion may destabilize nearby structures and negatively influence aquatic fauna.

Moreover, known methods of in-situ shaped pile-anchor foundations that use hydroelectric immersed technology ("HIT") require withdrawal of a high voltage discharge device(s) from the wet concrete column after its shaping. Such a removal, however, may disturb the process of concrete solidification by weakening the concrete column's internal structure, creating micro-cracks, and weakening the resulting pile-anchor.

Therefore, one object of the invention is to provide a foundation having an improved ability to withstand vertical, lateral, and/or rotational forces in aquatic environments by using one or more in-situ shaped pile-anchors comprising a metal casing that covers the upper portion of the pile-anchor's concrete column.

Another object of the invention is to provide an aquatic-based foundation having one or more in-situ shaped pile-anchors, comprising a metal casing that encases the upper portion of the pile-anchor's concrete column, that are formed using a hydroelectric immersed technology ("HIT"), which utilizes high voltage discharge pulses in wet concrete.

Another object of the invention is to provide a foundation having one or more shaped pile-anchors formed using HIT, without the pile-anchor weakening issues present in the prior art.

Another object of the invention is to provide an aquatic-based anchoring having one or more shaped anchors embedded into an aquatic-floor soil and coupled, via anchoring cables, to a floating platform located at the surface of the aquatic medium.

SUMMARY OF THE INVENTION

As used herein, the term "pile-anchor" refers to an at least partially buried structural pile that can withstand downward forces exerted against it (e.g., compression, due to weight), while also having features that prevent the element from being pulled out of the ground (i.e., anchoring features). The present invention is directed at foundation systems and methods using novel in-situ shaped pile-anchors, and that are particularly useful in aquatic environments, where a significant portion of the pile-anchor is both formed and operates in aquatic medium (water). Particularly, a shaped pile-anchor of the invented foundation includes a concrete filled tubular metal casing, the bottom end of which is positioned at a predetermined depth in the ground (e.g., aquatic-floor soil) and the top end of which protrudes above the water surface. Concrete fills the inside of the metal casing substantially all the way to the top end of the casing, forming an upper portion of a concrete column. (Note, as long as the resulting shaped pile-anchor has sufficient strength to withstand required loads, the upper portion of the pile-anchor's concrete column may fill the inside of the metal casing only partially, e.g., half-way up the height of the metal casing. Such an alternative embodiment would reduce the amount of concrete required for the project, further lowering the project's material and labor costs.) The lower portion of the concrete column extends down below the bottom end of the metal casing and further into the ground. The lower portion is shaped to have a cross-section, in at least one location of the lower portion, that is greater than the cross-section of the upper portion of the concrete column, which is the inner diameter of the tubular metal casing.

In one embodiment, the invented pile-anchor further includes a metal (e.g., steel) armature—rods, bars, or mesh—embedded in the concrete column, creating a reinforced concrete column, and resulting in the pile-anchor having additional strength to withstand tensile and shear stresses.

Although the invented foundation systems and methods can be used with any number of the novel pile-anchors (i.e., one or more pile-anchors), because supporting structures should preferably provide symmetrically distributed support with respect to the bearing load, in one preferred embodiment the invented foundation system may have a single, centrally located pile-anchor, while in another preferred embodiment the invented foundation may have a few symmetrically positioned pile-anchors.

In one embodiment, the present invention contemplates connecting the shaped pile-anchor(s) to a supported structure (e.g., wind-turbine) directly. In another embodiment, the invention contemplates coupling the shaped pile-anchor to a supported structure via a platform. (As used herein, the term "platform" refers to any element that couples a shaped-pile anchor to a supported structure. For example, the term "platform" as used herein includes a coupling ring, a strut construction, etc.) The platform coupled with one or more shaped pile-anchors creates a support for structures positioned on it, such as toll towers, windmills, wind-turbines, electrical and signal towers, etc. In one embodiment, the platform is a substantially horizontal platform. Thus, the present invention contemplates coupling the one or more shaped pile-anchors to a supported structure (e.g., wind-turbine) with or without the use of a platform.

In one embodiment, the shaped pile-anchor connects to an element above it, such as a platform or the supported structure, using an attachment bar. The attachment bar is embedded in the pile-anchor's concrete column and protrudes above the concrete column's upper portion. The outer surface of the attachment bar is preferably profiled (ribbed, textured, etc.), preventing the attachment bar from being pulled out of the concrete column once the concrete has solidified. A shaped pile-anchor of the present invention may also be coupled to elements above it via the pile-anchor's metal casing. If the shaped pile-anchor comprises an attachment bar, coupling of the pile-anchor to elements above it may be accomplished via either the attachment bar, metal casing, or both. In one embodiment, the pile-anchor extends above the aquatic (water) surface and connects to elements above it (platform or supported structure) in the air. In another embodiment, the pile anchor does not extend above the aquatic surface and connects to elements above it under water.

The shaped, lower portion of the pile-anchor lowers the pile-anchor's center of gravity and, together with the upper portion surrounded by the metal casing, increases foundation's ability to withstand vertical, horizontal, and/or rotational forces exerted against it. Specifically, the increased footprint of the pile-anchor's lower portion increases the foundation's bearing capacity by having the downward loading forces distributed over greater surface area of the bearing soil. As a result, the pile-anchor can carry a heavier load before starting to sink further into the ground. In addition, the shaped portion of the pile-anchor gives it more weight and volume, both of which improve pile-anchor's ability to resist forces that might try to pull it out of the soil. This is most relevant in aquatic environments, where, in addition to any moment forces due to structures positioned on the platform, pile-anchors might experience upward-directed vertical forces due to waves hitting the platform from the bottom. At the same time, the metal casing surrounding the upper portion of the concrete column gives it further strength and also increases the pile-anchor's ability to withstand horizontal forces.

Because the invented foundation has an improved ability to withstand vertical, horizontal, and/or rotational forces (loads), it allows designers to reduce the diameter of the column(s) and the depth by which the pile-anchor needs to penetrate down into the soil. This, in turn, reduces a class of heavy equipment (cranes, etc.) and the amounts of materials and time needed to construct the foundation, leading to a reduction in construction costs.

The present invention also involves novel methods of forming shaped pile-anchor foundations. In one embodiment, shaping of the lower portion of the concrete column, while the concrete is wet, is performed using HIT. HIT is known to use high voltage discharge pulses between two precisely gapped electrodes (a high voltage discharge device) for electrical breakdown to create explosions within a fluid media, such as water or wet concrete. At the moment of the breakdown, a discharge zone is formed, the pressure and temperature in which can reach $10^{13}$ Pa and 10,000 degrees Celsius. The discharge zone transforms into a relatively small plasma cavity in the concrete mixture. The shock wave generated by the electric explosion transmits a powerful impulse of kinetic energy into the mixture, which acts on the surrounding soil to deform, move, and compress it. When the temperature of the plasma has dropped, the pressure in the plasma cavity also drops, the concrete mixture fills the cavity under gravitation forces, thereby shaping and expanding the footprint of the lower portion of the concrete column. The discharges are repeated until the lower portion of the anchor is shaped (expanded) sufficiently. This expansion is estimated by the volume of the consumption of the wet concrete in the concrete column.

During shaping of the pile-anchor using HIT technology, no additional gases and/or fluids are generated: the plasma ball is created from surrounded materials by its evaporation and ionization with consequent back condensation to the same volume without any chemical reaction and/or conversion.

Although the HIT technology is preferable for shaping the pile-anchor of the present invention, the invention contemplates shaping the pile-anchor using other technologies, such as by hydraulics and by explosives. Regardless of the shaping technology used, however, the pile-anchor of the present invention differs from the prior art shaped pilings at least in that it comprises a metal casing that surrounds the upper portion of the pile-anchor's concrete column, which strengthens the pile-anchor and improves its ability to withstand various forces. Furthermore, in contrast to the prior art HIT-using methods of forming shaped pile-anchors, in one embodiment of the invented method, the high voltage discharge device (sparker) is not removed from the lower portion of the wet concrete column after shaping it but is instead permanently left embedded within the concrete material. By not removing the high voltage discharge device from the concrete after shaping, i.e., by not pulling the high voltage device, as well as its connecting conductors, from the lower portion of the column all the way up to the surface, the risk of creating micro-cracks in the concrete column and weakening it is eliminated.

In another improvement over the prior art, when the invented shaped pile-anchor includes an attachment bar, the attachment bar may be a metal tube with hollow center. In such an embodiment, the method of the present invention may utilize the attachment bar not only to couple the pile-anchor (connect directly or indirectly) to a platform during the foundation assembly process (or directly to a structure supported by the foundation, such as a wind-turbine), but also use the attachment bar as an outer conductor of two coaxially positioned conductors for delivering high voltage pulses down to the high voltage discharge device during shaping of the concrete column. In one embodiment, the present invention provides an aquatic-based support system comprising a pile-anchor and a platform coupled to the at least one pile anchor, such that the aquatic-based support system provides an enhanced ability to withstand vertical, lateral, and/or rotational forces. In the embodiment, the pile-anchor of the above aquatic-based system includes: (i) a tubular metal casing having a central axis, a top end, and a bottom end, the bottom end located in an aquatic-floor soil and the top end protruding above an aquatic surface, (ii) a concrete column comprising an upper portion and a lower portion, the upper portion filling the tubular metal casing and extending from about the top end of the tubular metal casing down to the bottom end of the tubular metal casing, and the lower portion, shaped by an at least one local high-pressure spike (created, for example, by at least high voltage discharge pulse), extending below the bottom end of the tubular metal casing further down into the aquatic-floor soil and having a cross-section that is greater than a cross-section of the upper portion, the lower portion increasing the pile-anchor's load bearing capacity, and (iii) an at least one attachment bar embedded at least into the upper portion of the concrete column, the at least one attachment bar having a top end protruding above the upper portion of the concrete column. The platform is coupled to the at least one pile-anchor, either via the top end of the at least attachment bar, the metal casing, or both, and is configured to support a structure, such as a wind-turbine that is securely coupled to the platform.

In one embodiment, the system may comprise a plurality of pile-anchors positioned in a symmetrical configuration (e.g., triangular, rectangular, circular, etc.).

In one embodiment, the at least one attachment bar may comprise a first attachment bar having a top end protruding above the upper portion of the concrete column, the first attachment bar extending down into the lower portion of the concrete column along the central axis of the tubular metal casing, wherein the first attachment bar comprises a tubular metal body forming an outer conductor in a coaxial pair of conductors that are electrically insulated from each other, with the other conductor in the coaxial pair of conductors constituting an inner conductor, and wherein the outer and inner conductors are configured to conduct the at least one high voltage discharge pulse for shaping of the lower portion of the concrete column. The lower portion of the concrete column may include a high voltage discharge device comprising a first electrode and a second electrode, wherein the first electrode is electrically coupled to the outer conductor and the second electrode is electrically coupled to the inner conductor.

In one embodiment, the at least one attachment bar may comprise a plurality of attachment bars positioned symmetrically about the central axis of the tubular metal casing.

In one embodiment, the plurality of attachment bars comprises a first attachment bar and a second attachment bar, wherein each of the first and second attachment bars has a top end protruding above the upper portion of the concrete column, wherein each of the first and second attachment bars extends down into the lower portion of the concrete column, wherein each of the first and second attachment bars comprises a tubular metal body forming an outer conductor of a coaxial pair of conductors that are electrically insulated from each other, with the other conductor of the coaxial pair of conductors constituting an inner conductor, and wherein the outer and inner conductors of the coaxial pair of conductors are configured to conduct at least one high voltage discharge pulse for shaping the lower portion of the concrete column.

The lower portion of the concrete column may comprise a plurality of high voltage device, such as a first high voltage discharge device and a second high voltage discharge device, each of the first and second high voltage discharge devices comprising a first electrode and a second electrode, wherein the first electrode of the first high voltage discharge device is electrically coupled to the outer conductor of the first attachment bar, wherein the second electrode of the first high voltage discharge device is electrically coupled to the inner conductor of the first attachment bar, wherein the first electrode of the second high voltage discharge device is electrically coupled to the outer conductor of the second attachment bar, and wherein the second electrode of the second high voltage discharge device is electrically coupled to the inner conductor of the second attachment bar.

In one embodiment, the invention provides an aquatic-based support system having an enhanced anchoring capacity and comprising: i) an at least one pile-anchor, ii) a floating platform having a top surface and configured to support a structure, such as a wind-turbine, and iii) an at least one anchoring cable coupling the floating platform to the at least one pile-anchor.

In such an embodiment, each of the at least one pile-anchors includes: i) a tubular metal casing having a central axis, a top end, and a bottom end, wherein the bottom end is located in an aquatic-floor soil, and wherein the top end is protruding above the aquatic-floor soil and is located below an aquatic surface (water surface) and ii) a concrete column comprising an upper portion and a lower portion, the upper portion filling the tubular metal casing and extending from the bottom end of the tubular metal casing up to about the top end of the tubular metal casing, and the lower portion, shaped by an at least one local high-pressure spike (e.g., from high voltage discharge pulse), extending from the bottom end of the tubular metal casing further down into the aquatic-floor soil and having a zone with a cross-section that is greater than a cross-section of the upper portion.

In such an embodiment, each of the at least one anchoring cables includes a top end and a bottom end, wherein the cable's top end is coupled to the floating platform and the cable's bottom end is couple to the cable's corresponding pile-anchor.

In one such embodiment, the at least one pile-anchor comprises a plurality of pile-anchors positioned in a symmetrical configuration (e.g., three pile anchors positioned in a triangular configuration) and the at least one anchoring cable comprises a plurality of anchoring cables coupled to the respective pile-anchors (e.g., at least three anchoring cables, each coupled to its respective pile-anchor).

The present invention also provides a method for constructing an aquatic-based support system that is configured to support a structure, such as a wind-turbine. The method includes forming a pile-anchor and coupling it to a platform or to a supported structure (e.g., wind turbine) via the pile-anchor's metal casing and/or a top end of the attachment bar, wherein the resulting aquatic-based support system provides enhanced ability to withstand lateral, vertical, and/or rotational forces.

In one embodiment of the invented method, the pile-anchor is formed using the steps of: i) providing a tubular metal casing having a central axis, a length, a top end, and a bottom end; ii) driving the bottom end of the tubular metal casing into an aquatic-floor soil, such that the top end of the casing extends above an aquatic surface (water surface); iii) substantially filing the tubular metal casing with a concrete mixture to create a stack of wet concrete; iv) inserting an at least one attachment bar down the tubular metal casing, the attachment bar having a top end protruding above the top of the tubular metal casing; v) vertically lifting the tubular metal casing by a predetermined height, thereby exposing a lower portion of the stack of wet concrete to a surrounding aquatic-floor soil; vi) generating an at least one high-pressure spike (created for example by a high voltage discharge pulse) in the lower portion of the stack of wet concrete to compress the surrounding aquatic-floor soil and to allow the concrete mixture to fill in a resulting space, thereby shaping the lower portion of the stack of wet concrete to have a zone with a cross-section that is greater than a cross-section of the stack of wet concrete withing the tubular metal casing; vii) depositing an additional amount of the concrete mixture into the tubular metal casing to compensate for a drop in a level of the stack of wet concrete following the at least one high voltage discharge pulse; and viii) allowing the stack of wet concrete to solidify, thereby forming a concrete column having an upper portion and a shaped lower portion. During the shaping process a volume of concrete, which formed the lower portion of the pile-anchor, is added to the top portion of the pile-anchor to fully fill the casing.

The invented methods allow formation of the pile-anchors described in the preceding paragraphs, and also disclosed in further detail below.

BRIEF DESCRIPTION OF THE FIGURES

The accompanying figures, where like reference numerals refer to identical or functionally similar elements throughout the separate views, together with the detailed description below, are incorporated in, form part of the specification, and serve to further illustrate embodiments of concepts that include the claimed invention and explain various principles and advantages of those embodiments.

Figure 1B:
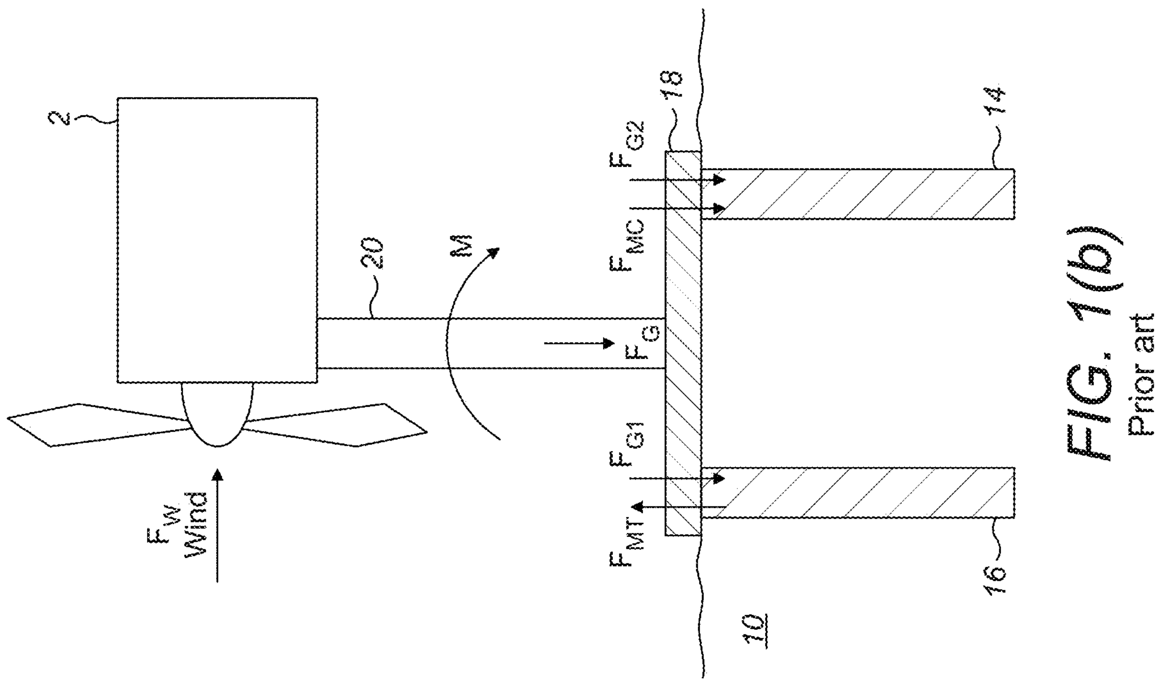
FIGS. 1(*a*) and 1(*b*) illustrate prior art onshore foundation systems.
Figure 1A:
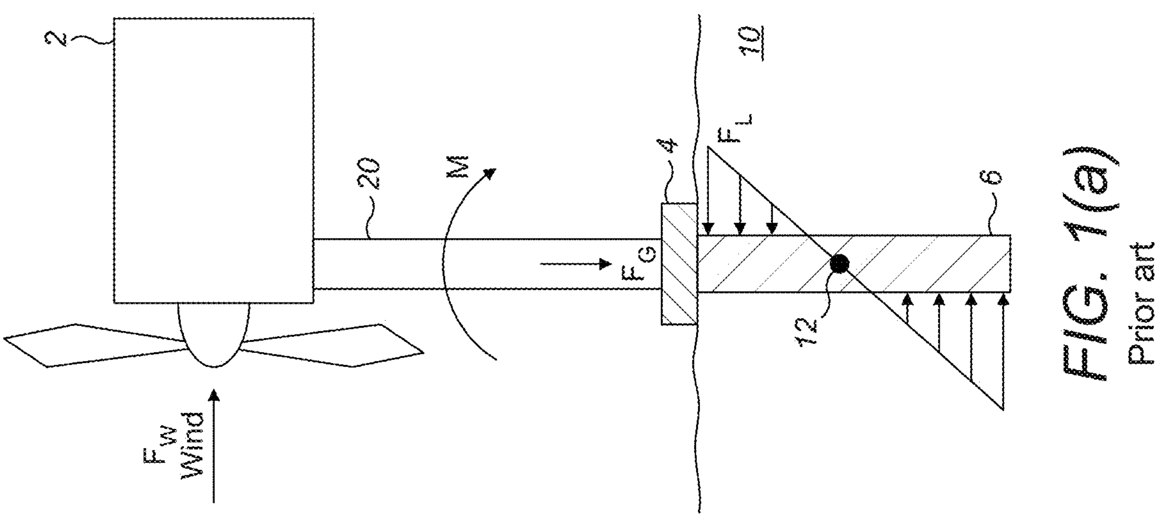
Figure 2:
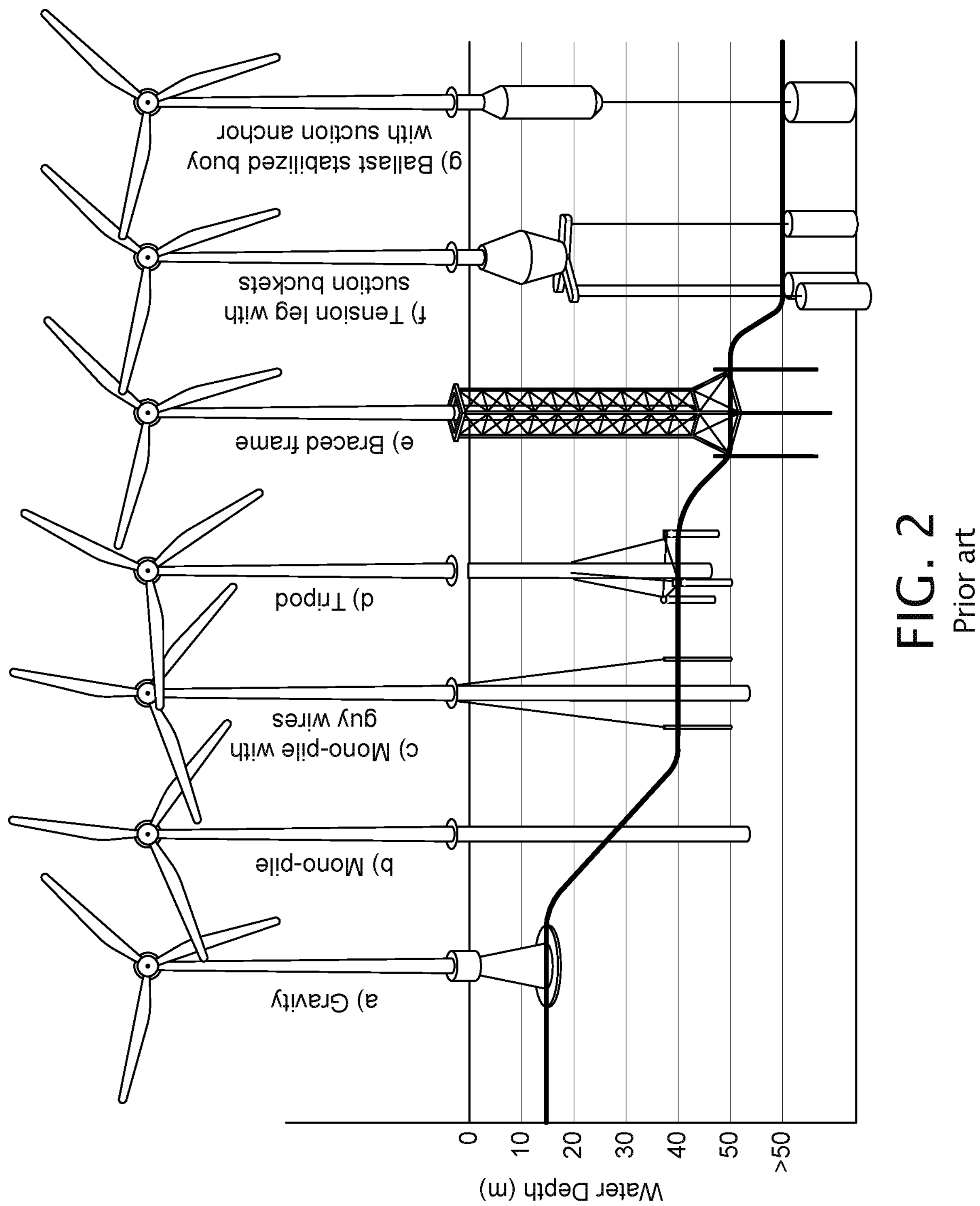
FIG. 2 illustrates different prior art offshore foundation systems.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description discloses some embodiments of the invented system and method of the present invention.

As mentioned above, the present invention is directed at support systems and methods using novel in-situ shaped pile-anchors that are particularly useful in aquatic environments, where a significant portion of the pile-anchor is both formed and operates in an aquatic medium (water).

Figure 3:
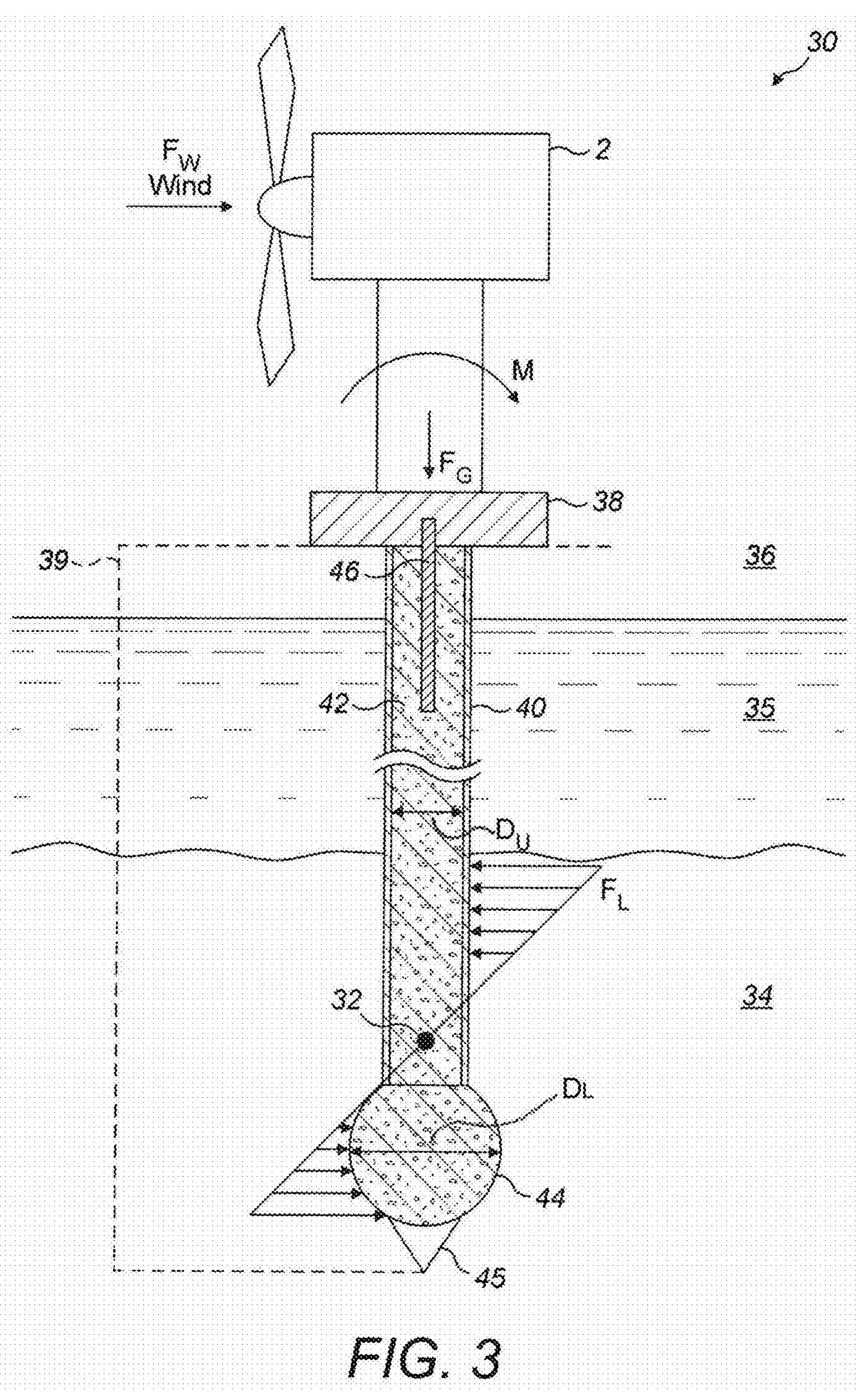
FIG. 3 illustrates an embodiment of an invented aquatic-based foundation comprising a single shaped pile-anchor supporting a wind-turbine structure.

FIG. 3 illustrates an embodiment of an invented aquatic-based foundation system 30 in which a wind-turbine structure 2 sits on top of a platform 38 that is supported by a single shaped pile-anchor 39. (In other embodiments, the wind-turbine structure may couple to the shaped pile-anchor directly, without the use of a platform.) The pile-anchor 39 is partially buried in an aquatic soil 34, passes through an aquatic medium (water) 35, and extends above the water level into the air 36. The pile-anchor 39 includes a metal casing 40 and a concrete column having two portions, an upper portion 42 and a lower portion 44. In the embodiment in FIG. 3, the upper portion 42 of the concrete column fills the metal casing 40 from the casing's bottom end up to, or near, the casing's top end. Reference "$D_U$" represents a cross-section of the upper portion 42 of the concrete column within the metal casing 40. Because, in the preferred embodiment, the metal casing 40 is tubular, the cross-section $D_U$ is uniform and equal to the casing's inner diameter. The use of the metal casing in the invented shaped pile-anchor strengthens the pile-anchor and makes it particularly adapted for use in aquatic environments. The lower portion 44 of the concrete column extends below the bottom end of the metal casing further down into the aquatic soil 34. The lower portion 44 is shaped to have a cross section $D_L$ that is greater than the cross-section $D_U$ of the upper portion 42 of the concrete column. In FIG. 3, the lower portion 44 has a bulbous (e.g., spherical) shape. Although the horizontal cross-section in the lower portion 44 will vary in size and form, it has a zone with a cross-section $D_L$ that is greater than the cross-section $D_U$ of the upper portion 42 of the concrete column. As shown in FIG. 3, $D_L$ is the maximum cross-section of the lower portion 44. In comparison to the cross-section $D_U$, the cross-section $D_L$ increases the footprint of the pile-anchor and distributes any downward forces transferred through the pile-anchor over a larger surface area of the bearing soil. In addition, shaping of the pile-anchor lowers its center of mass, making it more stable.

A metallic tip 45 extends from the lower portion 44 of the concrete column further down into the aquatic soil 34. Although in the embodiment in FIG. 3 the metallic tip has a conical shape, the invention is not so limited and contemplates other shapes, e.g., pyramidal. The primarily function of the metallic tip is to prevent water and soil collection inside the casing during driving of the casing 40 into the soil 34. The metallic tip 45 is detachably coupled to the casing 40. It, however, is permanently staged in the soil 34 during and after the casing is partially lifted during formation of the pile-anchor (as explained below).

In another embodiment, where the casing may be driven into the soils without the use of a metallic tip, the shaped-pile anchor does not include the metallic tip. However, in such an embodiment, the casing has to be cleaned from soil and water before the next steps in forming the pile-anchor are taken.

The pile anchor 39 further may include at least one attachment bar 46 embedded into the concrete column and having a top end protruding above the upper portion 42 of the concrete column and also preferably above the top end of the metal casing 40.

The attachment bar 46 should be embedded into the concrete column sufficiently deep, to prevent it from being pulled out of the concrete by the greatest upwardly directed vertical force that the attachment bar might experience. In one embodiment, the attachment bar extends all the way down into the lower portion 44 of the concrete column. The outer surface of the attachment bar 46 is preferably profiled (ribbed, textured, etc.), which further improves its retention within the concrete column.

In addition to having one or more attachment bars 46, the pile-anchor may further include a metal (e.g., steel) armature—rods, bars, or mesh—embedded in the concrete column, to further improved pile-anchor's tensile and shear characteristics.

The attachment bar 46 couples the pile-anchor 39 to the platform 38, either directly or indirectly. In a preferred embodiment, the platform 38 is a substantially horizontal platform. Although not shown in FIG. 3, a spacer may be used between the pile-anchor 39 and the platform 38.

In an embodiment in which a platform is omitted, an attachment bar may couple the shaped pile-anchor directly to a supported structure (e.g., wind-turbine). In an embodiment in which an attachment bar is omitted, the shaped pile-anchor may couple to a platform or to a supported structure via the anchor's metallic casing.

In FIG. 3, symbol $F_G$ represent the force exerted by weight of the wind-turbine structure on the platform 38. Assuming that the gravitational center line of the wind-turbine structure 2 coincides with the central axis of the tubular metal casing 40, force $F_G$ gets transferred vertically through the pile-anchor 39 onto the supporting soil. In contrast to the prior art piles, because the shaped lower portion 44 of the pile-anchor 39 has an increased cross-section $D_L$, as shown in FIG. 3, $D_L$ is the maximum cross-section of the lower portion 44. The increased cross-section of the footprint of the pile-anchor distributes any downward forces transferred through the pile-anchor over a larger surface area of the bearing soil.

When a wind is blowing as shown in FIG. 3, a horizontal force Fw acting against the wind-turbine structure 2 gets transferred to the foundation as a rolling moment M that tries to overturn the overall structure. This, in turn, causes the pile-anchor 39 to push against the soil 34. This lateral resistance can be viewed as a set of lateral forces $F_L$ acting along the section of the pile-anchor within the soil 34, while changing direction at a center-of-rotation point 32 along the pile-anchor. For example, with the rolling moment M acting as shown in the figure, the lateral force at the center-of-rotation point, reference 32, is 0 pounds (0 lb). As one moves up the pile-anchor above the center-of-rotation point 32, the lateral forces are directed from right to left and are gradually increasing, with the greatest leftward-directed force occurring at the soil's surface. As one moves down the pile-anchor below the center-of-rotation point 32, the lateral forces are directed from left to right and are gradually increasing, with the greatest rightward-directed force occurring at the bottom of the pile-anchor.

In addition, because waves on the surface of the aquatic medium 35 may be hitting the platform 38 from the bottom, they may be applying an upwardly vertical force against it. When such a force is greater than the downward force $F_G$, the resultant vertical force acting on the platform 38 will be upwardly directed vertical force. Because the platform 38 is rigidly coupled to the pile-anchor, the pile anchor will be in tension. In addition to having a metallic casing around the upper portion of the concrete column, to increase the pile-anchor's overall strength, the lower portion 44 of the concrete column enhances anchoring properties of the pile-anchor 39. For example, the lower portion 44 has a large surface area, which provides for an increased pile-anchor-to-soil binding, helping to prevent the pile-anchor from being pulled out of the soil.

In addition, increased volume of the lower portion 44 increases the pile-anchor's overall weight and lower's its center of mass, further improving the system's anchoring ability and maintaining pile-anchor-to-soil contact regardless of the directions of forces exerted on the pile-anchor.

Moreover, increasing the cross-section in the lower portion 44 of the concrete column increases the amount of soil above it. The weight of that soil further increases the system's anchoring characteristic.

Figure 4A:
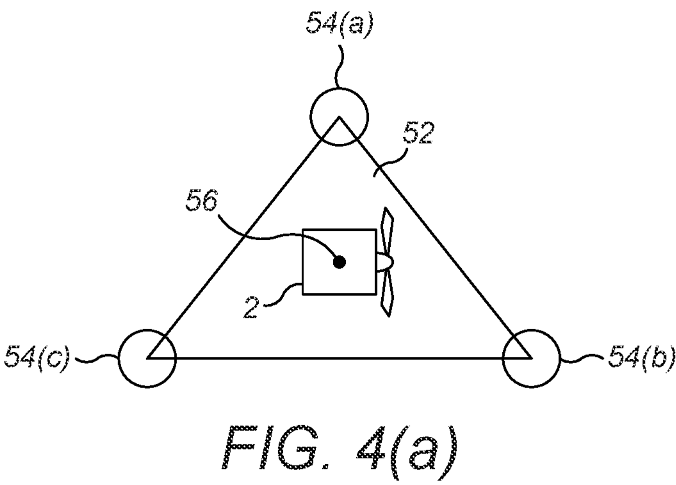
FIGS. 4(*a*)-4(*c*) illustrate various embodiments of an invented aquatic-based foundation comprising a plurality of shaped pile-anchors supporting a wind-turbine structure.
Figure 4B:
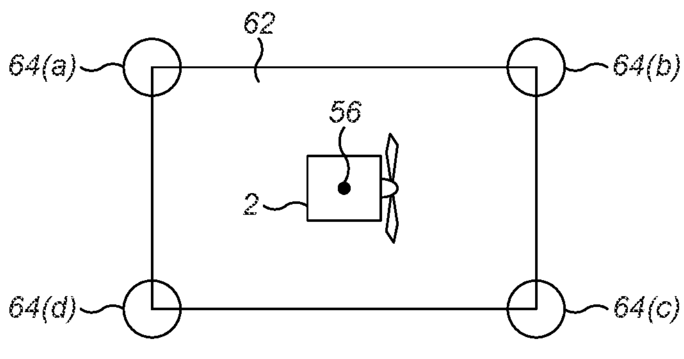
Figure 4C:
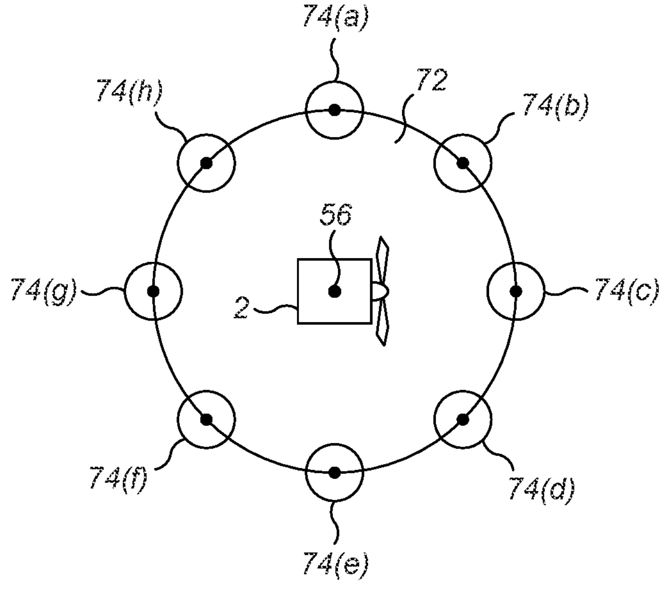

Although the invented support system can be used with any number of pile-anchors, it is preferably used with three or more pile-anchors symmetrically positioned to support the structures above. FIGS. 4(*a*) through 4(*c*) show a top view of several foundation systems comprising a plurality of symmetrically positioned shaped pile-anchors supporting a structure placed thereon.

For example, FIG. 4(*a*) illustrates a wind-turbine structure 2, sitting on top of a platform 52 that is supported by three equidistantly placed pile-anchors, 54(*a*), 54(*b*), and 54(*c*). The dot referenced by numeral 56 designates the center of mass of the wind-turbine structure coinciding with the center axis of the triangularly positioned support system.

FIG. 4(*b*) illustrates a wind-turbine structure 2, sitting on top of a platform 62 that is supported by four pile-anchors, 64(*a*), 64(*b*), 64(*c*), and 64(*d*) placed in a square configuration. The dot referenced by numeral 56 designates the center of mass of the wind-turbine structure coinciding with the center axis of the squarely positioned support system.

FIG. 4(*c*) illustrates a wind-turbine structure 2, sitting on top of a platform 72 that is supported by eight pile-anchors, 74(*a*), 74(*b*), 74(*c*), 74(*d*), 74(*e*), 74(*f*), 74(*g*), and 74(*h*) placed in a circular configuration. The dot referenced by numeral 56 designates the center of mass of the wind-turbine structure coinciding with the center axis of the circularly positioned support system.

Figure 5:
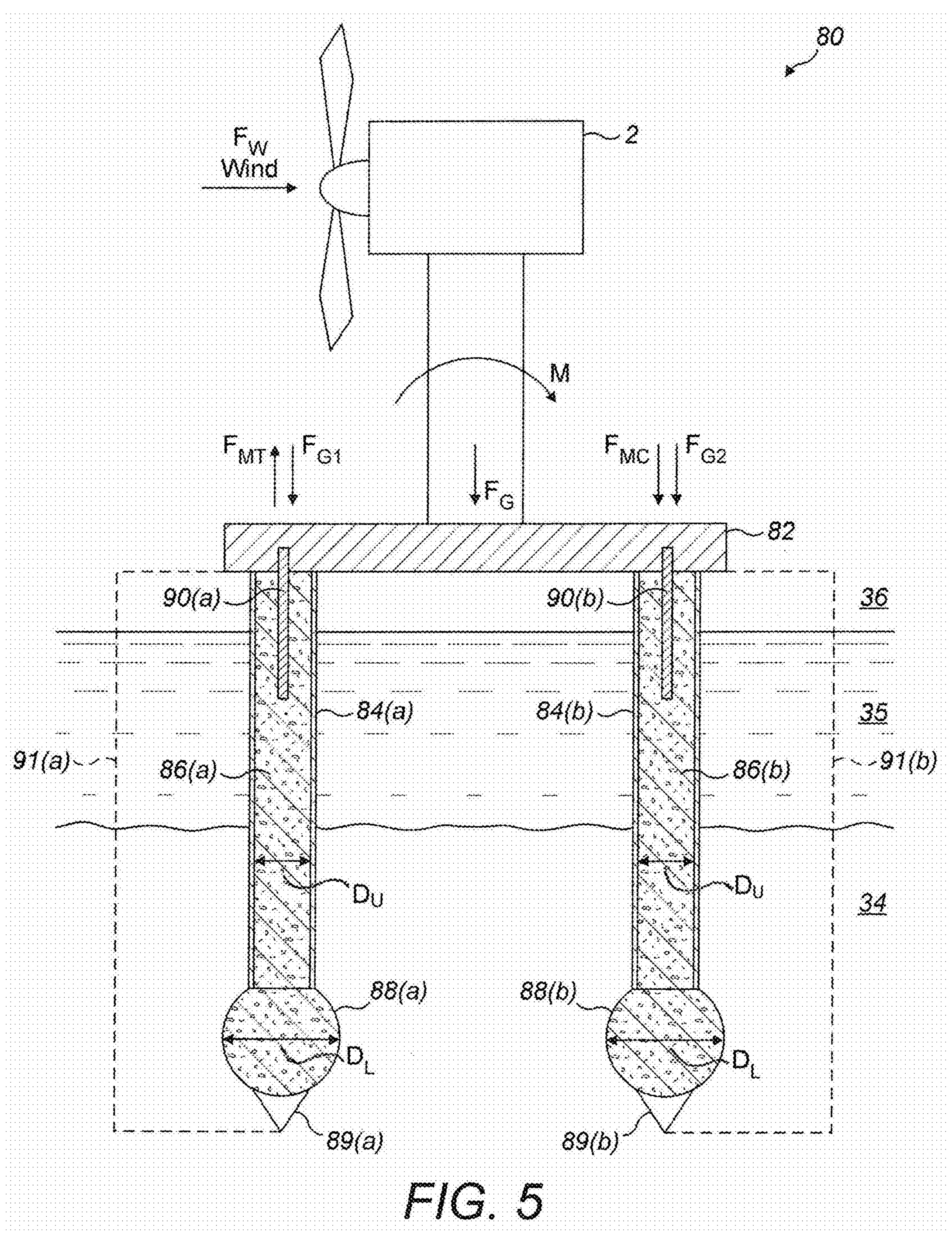
FIG. 5 shows a cross-sectional view of an embodiment of the invented aquatic-based foundation system employing a plurality of shaped pile-anchors.

FIG. 5 shows a cross-sectional view of an invented aquatic-based foundation system 80 in which a wind-turbine structure 2 sits on top of a platform 82 that is supported by a plurality of shaped pile-anchors. In the figure, the cross-sectional view is taken along a line between two adjacent pile-anchors 91(*a*) and 91(*b*). Viewing along the plane of the figure, the wind-turbine structure 2 is positioned between the two pile-anchors such that the gravitational force $F_G$ of the wind-turbine structure 2 is directed along the vertical line that is equidistant from the two pile-anchors 91(*a*) and 91(*b*) and gets distributed on the two pile anchors as gravitational downward components $F_{G1}$ and $F_{G2}$ of the gravitational force $F_G$.

Each pile-anchor 91(*a*) and 91(*b*) is partially buried in an aquatic soil 34, passes through an aquatic medium (water) 35, and extends above the water level into the air 36. Each of the pile-anchors includes a metal casing 84(*a*) and 84(*b*), respectively, and a concrete column having two portions, an upper portion 86(*a*) and 86(*b*), respectively, and a lower portion 88(*a*) and 88(*b*), respectively. Each upper portion 86(*a*) and 86(*b*) of the concrete columns fills respective metal casing 84(*a*) and 84(*b*) from the casing's bottom end up to, or near, the casing's top end. Reference "$D_U$" represents a cross-sectional dimension of each upper portion 86(*a*) and 86(*b*) of the concrete columns within the respective metal casing 84(*a*) and 84(*b*). Because, in the preferred embodiment, the metal casings are tubular, the cross-section $D_U$ is uniform and equal to the casing's inner diameter. Each lower portion 88(*a*) and 88(*b*) of the concrete column extends below the bottom end of its respective metal casing 84(*a*) and 84(*b*) further down into the aquatic soil 34. Each lower portion 88(*a*) and 88(*b*) is shaped to have a cross section that is greater than the cross-section $D_U$ of its corresponding upper portion 86(*a*) and 86(*b*). In FIG. 5, each lower portion 88(*a*) and 88(*b*) has a bulbous or spherical shape. Although the horizontal cross-section of each lower portion varies in size and shape, each lower portion has a zone with a cross-section that is greater than the cross-section $D_U$ of its corresponding of concrete column. As shown in FIG. 5, $D_L$ is the maximum cross-section of the lower portions 88(*a*) and 88(*b*). In comparison to the cross-section $D_U$, the cross-section D increases the footprint of the respective pile-anchor and distributes any downward forces transferred through the pile-anchor over a larger surface area of the bearing soil.

A metallic tip 89(*a*), 89(*b*) extends from the corresponding lower portion 88(*a*), 88(*b*) of its respective concrete column further down into the aquatic soil 34. Although in the embodiment in FIG. 5 the metallic tip has a conical shape, the invention is not so limited and contemplates other shapes, e.g., pyramidal. As discussed above, another embodiment of the shaped pile-anchor may not use any metallic tip.

In FIG. 5, each pile-anchor further includes at least one attachment bar 90(*a*), 90(*b*) embedded into the respective concrete column and having a top end protruding above the column's upper portion. In one preferred embodiment, the top end of each attachment bar 90(*a*) and 90(*b*) also protrudes above the top end of the corresponding metal casing 84(*a*) and 84(*b*).

Each attachment bar 90(*a*) and 90(*b*) should be embedded into its respective concrete column sufficiently deep, to prevent the attachment bar from being pulled out of the concrete by the greatest upwardly directed vertical force that the attachment bar might encounter. In one embodiment, an attachment bar extends all the way down into the lower portion of its respective concrete column. The outer surface of each attachment bar is preferably profiled (ribbed, textured, etc.), which further improves the attachment-bar's retention within its respective concrete column.

In addition to having one or more attachment bars, each pile-anchor may further include a metal (e.g., steel) armature—rods, bars, or mesh—embedded in its concrete column, to further improved pile-anchor's tensile and sheer characteristics.

Each attachment bar 90(*a*) and 90(*b*) couples its respective pile-anchor 91(*a*), and 91(*b*) to the platform 82, either directly or indirectly. Ina preferred embodiment, the platform 82 is a substantially horizontal platform. The invention is not, however, so limited, and non-substantially horizontal platforms are also contemplated. Although not shown in FIG. 5, a spacer may be used between a pile-anchor and the platform.

The total vertical force acting on any one pile-anchor is a resultant force composed of several possible component forces. For example, the resultant force acting on an anchor is composed of a gravitational force component due to the weight of the wind-turbine 2, a force resulting from the wind blowing against the wind-turbine structure, and an upward directed force from the waves hitting the bottom of the platform 82.

As mentioned above, in FIG. 5, symbol $F_G$ represent the force exerted by weight of the wind-turbine structure 2 on the platform 82. Viewing along the plane of the figure, assuming the gravitational center line of the wind-turbine structure 2 is equidistant from each pile-anchor, the force $F_G$ will be transferred to each pile-anchor, and from there to the soil, as a distributed downward (compressive) force of magnitude $F_G/n$, where "n" represents the number of pile-anchors in the system. (In FIG. 5, the gravitational component forces are shown as $F_{G1}$ and $F_{G2}$.)

In addition, because waves on the surface of the aquatic medium 35 may be hitting the platform 82 from the bottom, they may be applying an upwardly directed vertical force against it (not shown). Because the platform 82 is rigidly coupled to the pile-anchors 91(*a*) and 91(*b*), if the wave-induced upward vertical force on a pile-anchor is greater than the downward force acting on the pile-anchor, the pile-anchor will be in tension.

Also, when a wind is blowing in the plane of FIG. 5 as shown, a horizontal force Fw acting against the wind-turbine structure 2 gets transferred to the foundation as a rolling moment M, which acts to overturn the overall structure. This, in turn, creates an upward (tensile) force $F_{MT}$ on the pile-anchor 91(*a*) and a downward (compressive) force $F_{MC}$ on the pile-anchor 91(*b*).

Thus, depending on the relative magnitude of the individual force components, pile-anchors 91(*a*) and 91(*b*) may either be in tension or in compression. Moreover, because the different directions of the possible $F_{MT}$ and $F_{MC}$ forces, pile-anchor 91(*a*) may be in tension while the pile-anchor 91(*b*) is in compression. The novel design of the pile-anchor(s) shown in FIG. 5, provides enhanced performance in both compressive and tensile regimes.

For example, because the shaped lower portion of each pile-anchor has an increased cross-section $D_L$, lowers the pile-anchor's center-of-mass, increases its footprint and distributes any resultant downward force transferred through the pile-anchor over a larger surface area of the bearing soil. As a result, not only is the pile-anchor's stability increased, but the soil is able to withstand greater overall downward (compressive) force before giving way.

At the same time, when a pile-anchor is in a tensile regime, larger surface area of the concrete column's lower portion provides for an increased pile-anchor-to-soil friction, helping to prevent the pile-anchor from being pulled out of the soil. In addition, increased volume of the concrete column's lower portion increases the pile-anchor's overall weight, reducing the magnitude of the resultant tensile force and thus, increasing the pile-anchor's anchoring characteristic. Moreover, increasing the cross-section of the concrete column's lower portion increases the amount of soil above it. The weight of that soil further increases the pile-anchor's anchoring characteristic.

As a result, the foundation comprising the improved pile-anchors(s) has an enhanced ability to withstand vertical, horizontal, and/or rotational forces (loads), allowing designers to reduce the diameter of the pile-anchor and the depth by which the pile-anchor needs to penetrate down into the soil. This, in turn, reduces a class of heavy equipment (cranes, etc.) and the amounts of materials and time needed to construct the foundation, leading to a reduction in construction cost and time.

Although the metal casing disclosed above was described as a single-piece structure (e.g., tubular structure having predetermined wall thickness), the invention contemplates metal casing being multi-piece structures (e.g., each casing composed of two or more tubular pieces) that could be delivered and assembled at the foundation-construction site. This could be especially advantageous for aquatic-based foundations that are constructed miles from shore, as it would allow smaller and less expensive delivery and assembly mechanisms.

The lower portion of the invented pile anchor's concrete column is shaped in-situ during forming of the pile-anchor. In one embodiment, the shaping of the lower portion of the concrete column is performed using HIT while the concrete is wet. HIT is known to generate high voltage ("HV") discharge pulses between two precisely gapped electrodes (a sparker, also referred to as a high voltage discharge device) to create electrical breakdown and explosions within a fluid media, such as water or wet concrete. At the instance of the breakdown, a discharge zone is formed, the pressure and temperature in which can reach $10^{13}$ Pa and 10,000 degrees Celsius. The discharge zone transforms into a relatively small plasma cavity in the concrete mixture. The shock wave generated by the electric explosion transmits a powerful impulse of kinetic energy into the mixture, which acts on the surrounding soil to deform, move, and compress it. When the pressure in the cavity drops, the concrete mixture fills the cavity under gravitation forces, thereby shaping and expanding the footprint of the lower portion of the concrete column. The frequency, energy, and number of discharges are controllable, the discharges are repeated until the lower portion of the anchor is shaped (expanded) sufficiently. This expansion is estimated by the volume of the consumption of the wet concrete in the concrete column. During the shaping process a volume of concrete, which formed the lower portion of the pile-anchor, is added to the top portion of the pile-anchor to fully fill the casing.

Figure 6A:
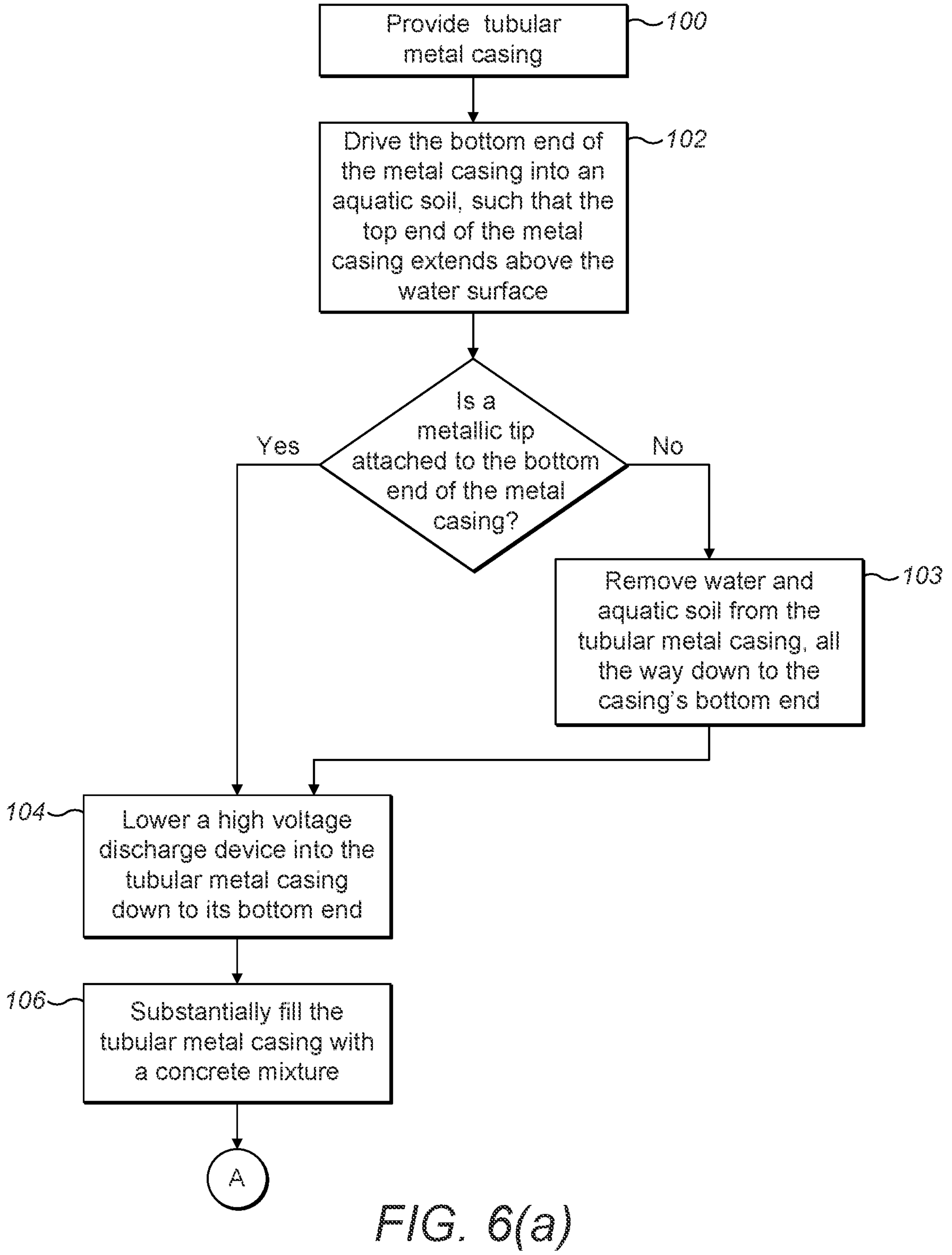
FIGS. 6(*a*) and 6(*b*) show a method for forming a shaped pile-anchor according to one embodiment of the invention.
Figure 6B:
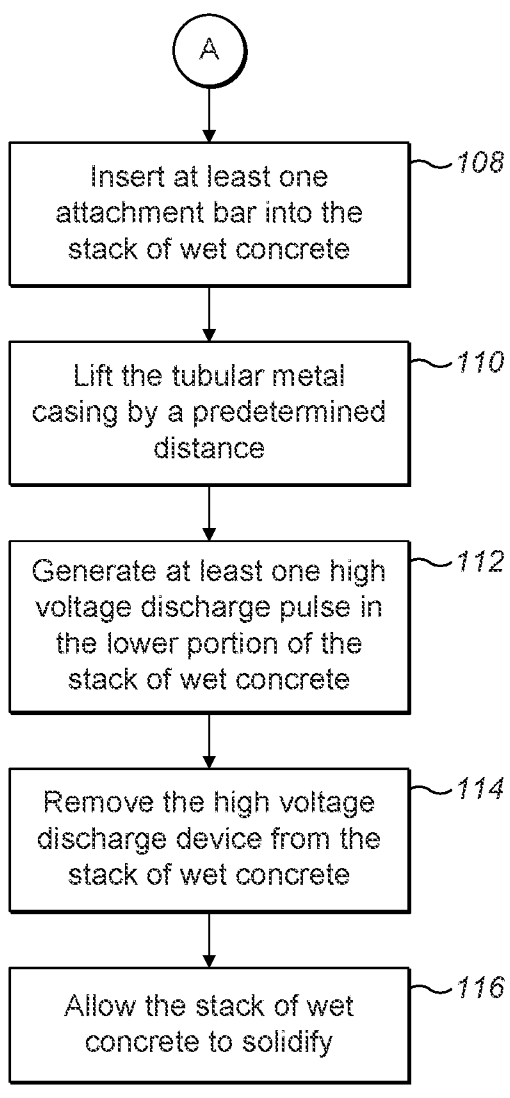

FIGS. 6(*a*) and 6(*b*) show a method for forming the shaped pile-anchor according to one embodiment of the invention. Looking at FIG. 6(*a*), the method starts at Step 100, by providing a tubular metal casing. The metal casing has a central axis, a length, a top end, and a bottom end.

Next, at Step 102, the bottom end of the metal casing is driven into soil by a predetermined depth, such that the top end of the metal casing extends above the water surface.

Next, a decision is made on whether a metallic tip was detachably coupled to the bottom end of the metal casing. If the answer is "yes," the method proceeds to Step 104. If, however, the answer is "no," in which case the interior of the tubular metal casing is now filled with water and aquatic soil, the method proceeds to Step 103.

At Step 103, the water and aquatic soils are removed from the interior of the tubular metal casing. This can be accomplished by pumping out the water and aquatic soil or by any other means known in the art. After completing Step 103, the method would proceed to Step 104.

At step 104, whether entering it directly or after completing Step 103, when using HIT technology, a high voltage discharge device, including a high voltage coaxial conductor pair is lowered into the metallic casing down to the bottom end of the casing. Each electrode of the high voltage discharge device will be connected to its respective electrical conductor of the coaxial conductor pair that will extend all the way up to, and above, the top end of the metal casing.

Next, at Step 106, the tubular metal casing is substantially filled with a concrete mixture, to create a stack of wet concrete. From there, the method proceeds to Step 108, in FIG. 6(*b*).

At Step 108, at least one attachment bar is inserted into the stack of wet concrete, with the top end of the attachment bar protruding above the top of the stack of wet concrete, and preferably also above the top end of metal casing. It is preferable to have the attachment bars positioned symmetrically with respect to the metal casing's central axis. If a single attachment bar is used, it is preferably positioned along a central axis of the metal casing. In addition. Step 108 may also include fully inserting a metal armature into the stack of wet concrete. (Note, in other embodiments, no attachment bar is used.)

At Step 110, the metal casing is lifted by a predetermined distance (height). If the metallic tip was attached to the bottom end of the metal casing, due to the weight of the stack of wet concrete on the metallic tip, lifting of the casing would detach the metallic tip from the casing. As a result, lifting of the metal casing exposes a lower portion of the stack of wet concrete, in which the high voltage discharge device is positioned, to the surrounding aquatic soil.

Figure 7:
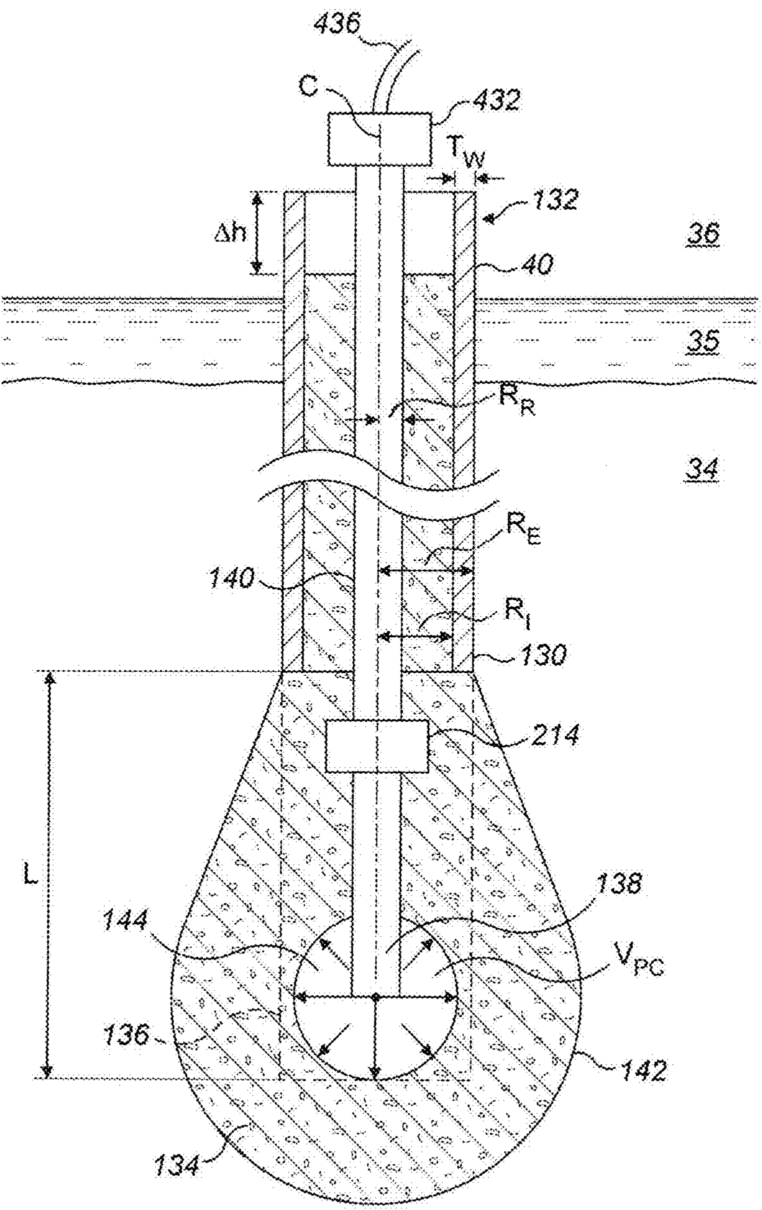
FIG. 7 illustrates what happens to the mixture of wet concrete during the discharge of a high voltage pulse.

At Step 112, using the high voltage discharge device, at least one high voltage discharge pulse is generated in the lower section of the stack of wet concrete. As explained above, the discharge creates an electric explosion, generating a shock wave (a local high-pressure spike) that moves, deforms, and compresses the surrounding aquatic soil. When the pressure in the plasma cavity drops, the concrete mixture fills the cavity under gravitation forces, thereby shaping and expanding the footprint of the lower portion of the concrete column. This results in the lower section of the stack of wet concrete having a footprint with a cross-section greater than the cross-section of the upper section of the stack, the latter being surrounded by the metal casing. The discharges are repeated, with the number, frequency, and energy of the pulses being controllable, until the lower portion of the stack is shaped (expanded) sufficiently. This expansion is estimated by the volume of the consumption of the wet concrete at the top of the concrete column (at the top end of the casing). For tubular casings, the total consumption volume may be determined by the formula $V=\Delta h*\pi*(R_1-R_R)^2$ where "Δh" is the total drop in the height of the stack of wet concrete after the discharge pulse(s) have been administered, "$R_1$" is the inner radius of the metal casing, and $R_R$ is the outer radius of the coaxial conductor pair. FIG. 7 illustrates in more detail what happens to the mixture of wet concrete during the discharge of the high voltage pulse in Step 112.

FIG. 7, depict a tubular metal casing 40 having a wall thickness "$T_W$" and a central axis "C" Accordingly, "$R_I$" is distance from the central axis to the interior surface of the wall of the metal casing and "$R_E$" which is equal to $R_1+T_W$, is the distance from the central axis to the exterior surface of the wall of the metal casing. The bottom end 130 of the casing is in the aquatic soil 34 and the top end 132 extends into the air 36 above the surface of the water 35. FIG. 7 further illustrates that the metal casing, which is filled with a concrete mixture 134 has been lifted by distance "L." FIG. 7 also shows a high voltage discharge mechanism inserted down into the concrete stack along the center axis C. The high voltage discharge mechanism includes a high voltage discharge device 138, the electrodes of which are connected to a coaxial conductor pair designated by reference 140 (which is described in more detail in FIG. 10) via a high voltage connector 214. As a result, after lifting and prior to any high voltage discharges, the concrete mixture 134 occupies the interior volume of the metal casing plus the volume designated by the dash line 136 and minus the volume occupied by the high voltage discharge mechanism. A high voltage cable 436 is coupled to the high voltage coaxial conductor pair 140 via a HV-cable-to-HV-conductor-pair connector 432.

When a discharge pulse is generated by the high voltage discharge device 138, an expanding plasma cavity 144 of maximum volume $V_{PC}$ is created per each discharge pulse in the lower section of the stack of wet concrete, generating a shock wave (illustrated by the outgoing arrows within the cavity 144) that moves, deforms, and compresses the surrounding aquatic soil. When the pressure in the plasma cavity drops, the concrete mixture fills the plasma cavity under gravitation forces, thereby shaping the expanding footprint of the lower portion of the concrete column and dropping the level of concrete on the top of the casing on Δh. Reference 142 designates the resulting bulbous outline of the shaped lower portion of the stack of wet concrete. As the concrete fills the cavity under gravitational forces, the level of the wet concrete in tubular metal casing drops. In FIG. 7, this drop is designated by the label "Δh." Knowing the inner radius $R_1$ of the tubular casing and measuring the drop in the height of wet concrete in the casing, labeled as Δh, one can determine the volume by which the concrete in the stack dropped following each pulse using the formula $V=\Delta h*\pi*(R_1-R_R)^2$. Because this volume equals the volume by which the lower portion of the concrete stack has expanded, by monitoring the Δh and repeating the high energy discharges, one can achieve the amount of required expansion. (In determining the amount of volume expansion, the volume taken up by the armature and any separate attachment bars present in the Δh span may also be taken into consideration.)

Coming back to FIG. 6(*b*), in Step 114, the high voltage discharge device, together with the coaxial electrical conductors, is removed from the stack of wet concrete. During the shaping process and after removing the high voltage discharge device a volume of concrete, which formed the lower portion of the pile-anchor, is added to the top portion of the pile-anchor to fully fill the casing.

At Step 116, the stack of wet concrete is allowed to solidify, thereby forming a concrete column having i) an upper portion surrounded by the metal casing, and ii) a shaped lower portion. The concrete column together with the metal casing and the attachment bar, as well the metallic tip (if present), constitute a shaped pile-anchor.

It should be noted that not all the steps disclosed above may be performed in the described order. For example, the attachment bar and armature can be lowered into the metal casing before it is filled with wet concrete. Similarly, the high voltage discharge mechanism could be lowered down into the metal casing either before or after the casing is substantially filled with wet concrete.

It is also envisioned that the meatal casing could be composed of multiple sections that are joined together during Step 102. Specifically, if the depth by which the casing is driven into the soil is great, Step 102 could be composed of several sequential sub-steps. For example, starting with Sub-step 102(*a*), the bottom end of the first section of the metal casing is driven into the soil such that the top end of the first section of the casing extends above the water surface. Then, at Sub-step 102(*b*), the bottom end of the second section of the metal casing is securely joined with the top end of the first section of the metal casing. Then, in Sub-step 102(*c*), the bottom end of the first section of the metal casing is driven further into the soil, with now only top end of the second section extending above the water surface.

Once all the shaped pile-anchors have been created, they are coupled to a platform via their respective attachment bars. The platform coupled to one of more shaped pile-anchors creates a foundation for structures positioned on it, such as wind-turbines, toll towers, electrical and signal towers, etc.

In one embodiment, an attachment bar has threads at its top end, and the platform is coupled to the pile-anchor by a nut. In another embodiment, coupling is achieved by welding the attachment bar to the platform. The invention is not limited in the way the platform attaches to the pile-anchor, and other known attachment methods are also within the scope of the invention.

The invention also contemplates using spacers between the platform and the pile-anchors to adjust the platform's level. In one preferred embodiment, the platform will be leveled substantially horizontally.

Figure 8:
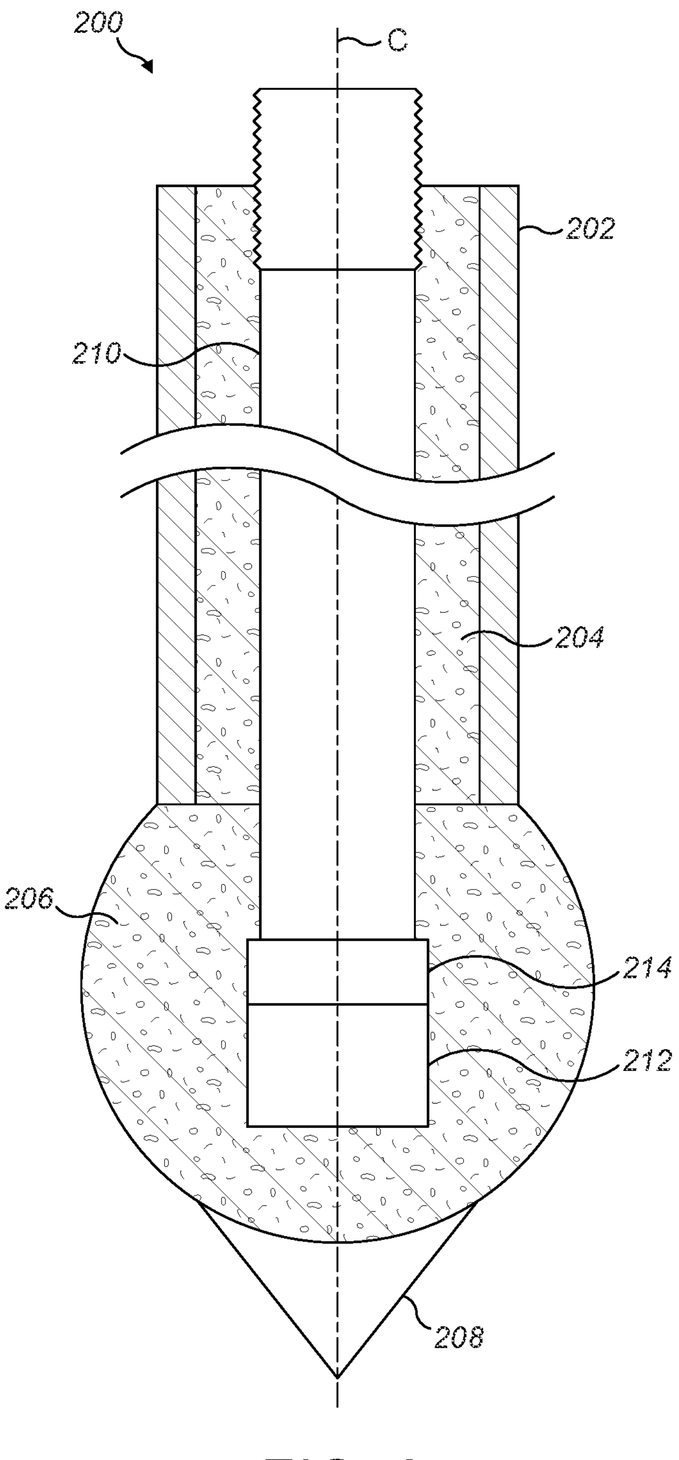
FIG. 8 shows an alternative embodiment of the shaped pile-anchor of the present invention.

FIG. 8 illustrates another embodiment of the invention, in which the high voltage discharge mechanism remains embedded in the pile-anchor and in which the attachment bar also functions as a part of the high voltage discharge mechanism. The novel pile-anchor 200 in FIG. 8 comprises a metal casing 202 (preferably tubular in shape), a concrete column with an upper portion 204 and a shaped lower portion 206, a metallic tip 208, and an attachment bar 210, which is the external conductor of a coaxial conductor pair for a high voltage discharge device 212. The attachment bar 210 extends all the way down to the lower portion 206 of the concrete column and is coupled to a high voltage discharge device 212 via a high voltage conductor-to-electrode connector 214. (It should be noted that in another embodiment of the invention, the pile-anchor has no metallic tip.)

In the figure, the attachment bar 210 and high voltage discharge device 212 are positioned along a central axis "C" of the concrete column, which also passes through the center of the metallic tip 208. The top end of the attachment bar 210 is threaded, for attachment to a platform. In another embodiment, coupling to the platform may be achieved by welding the attachment bar to the platform. The invention is not limited in the way the platform attaches to the pile-anchor, and other known attachment methods are also within the scope of the invention.

The outer surface of the attachment bar 210 below its threaded section is preferably profiled (ribbed, textured, etc.), enhancing the pile-anchor's ability to resist pullout of the attachment bar from concrete.

Although FIG. 8 depicts an embodiment of the pile-anchor comprising a single embedded high voltage discharge mechanism, using a single high voltage discharge device 212, the invented pile-anchor may comprise more than one high voltage discharge mechanism.

The embodiment of the shaped pile-anchor in FIG. 8 provides at least three advantages over the earlier-described pile-anchor embodiment. First, because the high voltage discharge device 212 remains embedded in the concrete column after shaping of the column lower portion, the risk of creating micro-cracks in the concrete column during withdrawal, thus potentially weaking the concrete column, is eliminated. Second, not having to withdraw the high voltage discharge device from the wet concrete stack also reduces labor costs. Third, having the attachment bar 210 as a sequential combination of relatively short similar sections connected through high voltage inter-sectional connector(s), it is possible to simplify the process of pile-anchor shaping by avoiding dealing with very long parts (in some cases up to 80 meters).

When using a single high voltage discharge mechanism, for the lower portion of the concrete stack to expand its cross-section uniformly, it is preferable that the attachment bar 210 and high voltage discharge device 212 be positioned along the central axis of the concrete column. When using more than one high voltage discharge mechanism, it is preferable that the high voltage discharge mechanisms be positioned with respect to the central axis of the concrete column symmetrically.

Figure 9A:
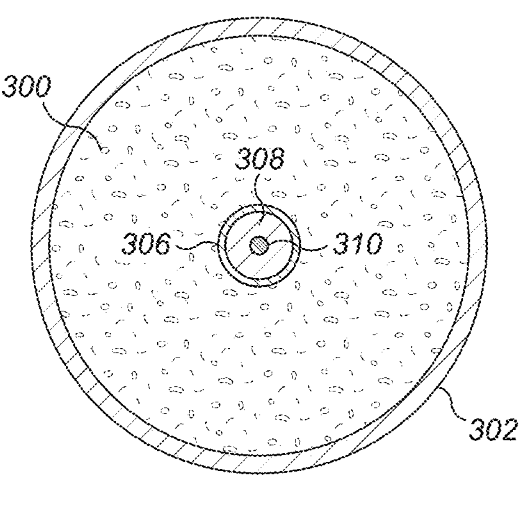
FIGS. 9(*a*)-9(*c*) show a top view of the shaped pile-anchor with various placements of the high voltage discharge mechanisms.
Figure 9B:
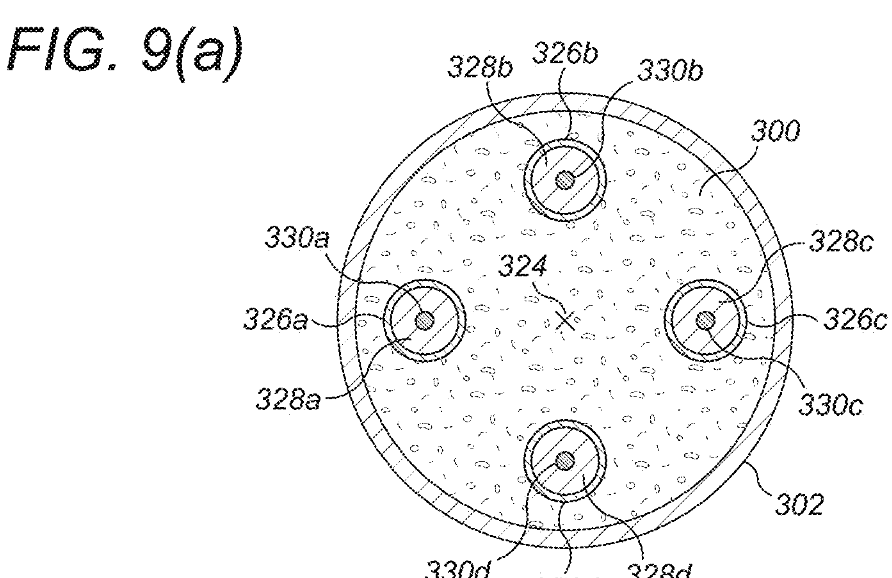
Figure 9C:
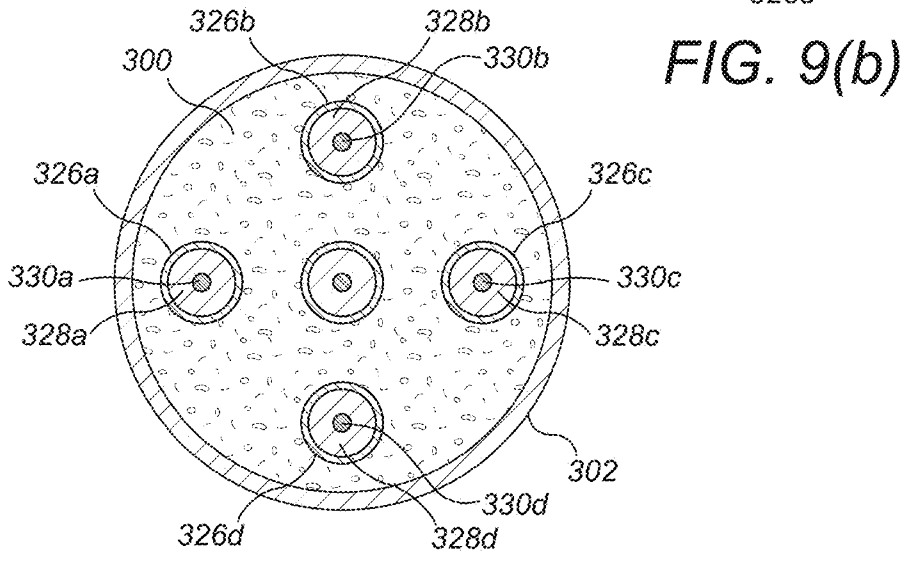

FIGS. 9(*a*)-(*c*) show a top view of the shaped pile-anchor with various placements the high voltage discharge mechanisms.

FIG. 9(*a*), for example, depicts a top of the shaped pile-anchor with a single high voltage device mechanism. Specifically, reference 300 represents a top surface of the upper portion of the concrete column surrounded by a tubular metal casing 302. An attachment bar 306, serving as one of the conductors for the high voltage discharge device located in the lower portion of the concrete column, is positioned along the central axis of the concrete column, which coincides with the central axis of the tubular metal casing 302. A high voltage central conductor 310 runs coaxially with the attachment bar 306 along the central axis of the concrete column. The high voltage central conductor 310 is separated from the attachment bar by a high voltage insulator 308. (While the central conductor 310 and insulator 308 are described as separate elements from the attachment bar 306, they can be viewed as components of the attachment bar structure. The same applies to the descriptions of the attachment bar structure in FIG. 9(*b*) below.)

FIG. 9(*b*) is a top view of the shaped pile-anchor with four high voltage device mechanisms, including their respective conductors, positioned symmetrically with respect to the shaped pile-anchor's central axis 324. Reference 300 represents a top surface of the upper portion of the concrete column surrounded by a tubular metal casing 302. Reference 324 designates the central axis of both concrete column 300 and the casing 302. Starting with the high voltage discharge mechanism to the left of the central axis 324, reference 326(*a*) designates an attachment bar serving as one of the conductors for the mechanism's high voltage discharge device below. Reference 330(*a*) is a high voltage central conductor, coaxial with the attachment bar 326(*a*) and serves as the other conductor for the mechanism's high voltage discharge device below. Reference 328(*a*) is a high voltage insulator between the two coaxial conductors 326(*a*) and 330(*a*).

Working clockwise to the second high voltage attachment mechanism in FIG. 9(*b*), reference 326(*b*) is an attachment bar serving as one of the conductors for the mechanism's high voltage discharge device below. Reference 330(*b*) is a high voltage central conductor, coaxial with the attachment bar 326(*b*) and serves as the other conductor for the mechanism's high voltage discharge device below. Reference 328(*b*) is a high voltage insulator between the high voltage central conductor 330(*b*) and the attachment bar 326(*b*).

Continuing clockwise to the third high voltage attachment mechanism in FIG. 9(*b*), reference 326(*c*) is an attachment bar serving as one of the conductors for the mechanism's high voltage discharge device below. Reference 330(*c*) is a high voltage central conductor, coaxial with the attachment bar 326(*c*) and serves as the other conductor for the mechanism's high voltage discharge device below. Reference 328(*c*) is a high voltage insulator between the high voltage central conductor 330(*c*) and the attachment bar 326(*c*).

Finally, continuing clockwise to the fourth high voltage attachment mechanism in FIG. 9(*b*), reference 326(*d*) is an attachment bar serving as one of the conductors for the mechanism's high voltage discharge device below. Reference 330(*d*) is a high voltage central conductor, coaxial with the attachment bar 326(*d*) and serves as the other conductor for the mechanism's high voltage discharge device below. Reference 328(*d*) is a high voltage insulator between the high voltage central conductor 330(*d*) and the attachment bar 326(*d*). Note, as long as the high voltage discharge mechanisms, including their respective conductors, are positioned symmetrically with respect to the central axis, they can be located at any distance from the central axis, including right up to the inner surface of the tubular metal casing. For example, when the metal attachment bar also serves as a conductor for the high voltage discharge device, it could be electrically and/or mechanically connected to the metal casing's interior surface, such as by welding.

FIG. 9(*c*) is a top view of a shaped pile-anchor comprising five high voltage discharge mechanisms arranged as a combination of the layouts in FIGS. 9(*a*) and 9(*b*), with one high voltage discharge mechanism located along the pile-anchors central axis, and the other four mechanisms located off the central axis but symmetrical with respect to it.

Figure 10:
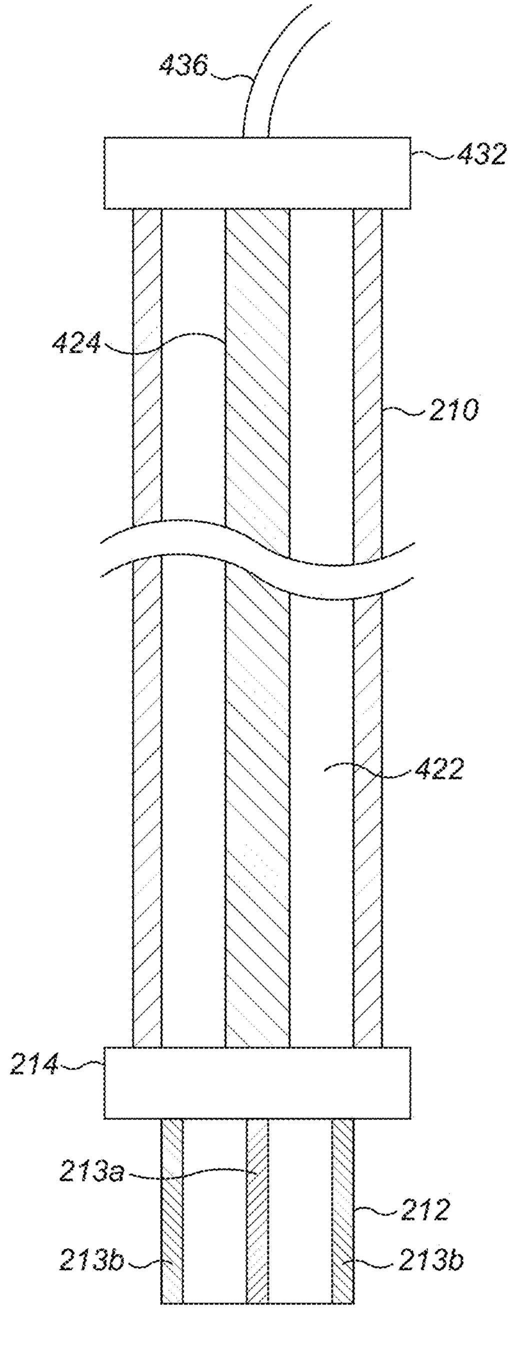
FIG. 10 illustrates in further detail a high voltage discharge mechanism of the shaped pile-anchor in FIG. 8.

FIG. 10 illustrates in further detail the high voltage discharge mechanism (system) of the shaped pile-anchor in FIG. 8. The mechanism includes a metallic attachment bar 210, having a tubular shape, that is electrically and mechanically coupled to a high voltage discharge device 212. The tubular attachment bar 210 forms an outer conductor for the high voltage discharge device 212. In particular, the attachment bar 210 acts as a second conductor during delivery of high voltage discharge pulses. A high voltage central conductor 424 runs coaxially within the attachment bar 210 and forms an inner conductor of a coaxial conductor pair for the high voltage discharge device 212. A high voltage insulator 422 separates the high voltage central conductor 424 from the attachment bar 210. As a result, the high voltage central conductor 424, insulator 422, and attachment bar 210 form a coaxial conducting structure, which can be referred to as an attachment-bar element. The wall of the attachment bar 210 should be thick enough to withstand forces that may act on it in the foundation system, e.g., tension and sheer forces.

The high voltage discharge device 212 includes two precisely gapped high voltage electrodes. A coaxial high voltage connector 214 electrically couples the high voltage central conductor 424 to one of the two high voltage electrodes and couples the attachment bar 210 (second conductor) to the other one of the two high voltage electrodes. The two electrodes, as an example, are coaxially positioned, forming an inner electrode 213*a* and an outer electrode 213*b*. In such a configuration, the coaxial high voltage connector 212 electrically couples the high voltage central conductor 424 to the inner electrode 213*a* and couples the attachment bar/conductor 210 (second conductor) to the outer electrode 213*b*.

The invention is not, however, limited to using high voltage discharge devices with coaxially positioned electrodes, and other electrode configurations are withing the scope of this invention. For example, the high voltage discharge device could use two non-coaxial electrodes that are symmetrically positioned with respect to the central axis of the attachment bar 210.

The top end of the attachment bar may be threaded. To generate a high voltage discharge pulse at the electrodes, a high voltage coaxial connector 432 is connected to the attachment bar/conductor 210 first. The connector 432 electrically connects the attachment bar conductor 210 and high voltage central conductor 424 with a coaxial high voltage cable 436. The other side of the cable is connected to a high voltage power supply and control circuit. In operation, the high voltage pulse gets transmitted through a central conductor of the high voltage cable 436 to the high voltage central conductor 424, and then to the inner electrode of the high voltage discharge device. The outer electrode of the high voltage discharge device 212, attachment bar conductor 210, and the outer coaxial conductor in the cable 436 act as a return path (second conductor) for the current back to the power supply and control circuit.

In FIG. 10, the high voltage insulator 422 is shown contacting the inner surface of the attachment bar 210, without any air gap in between. This could be the case when the insulation material is injected into the attachment bar 210 under pressure, forming an integrated central conductor-insulator-attachment bar structure, designated by combination of the reference numerals 424—422—210.

In an alternative embodiment, the central conductor 424 and insulator 422 may be manufactured as an integrated structure first. Then, this integrated structure is inserted into (pulled through) the inner space of the attachment bar 210. When the outer diameter of the insulation matches the inner diameter of the attachment bar 210, a small air gap between the insulator and the inner wall of the attachment bar 210 might result due to manufacturing tolerances. If, however, the outer diameter of the insulation is appreciably smaller than the inner diameter of the attachment bar 210, to position and keep the high voltage central conductor coaxial with the attachment bar 210, the insulator 422 may incorporate extrusions along its length, where the outer diameter of each extrusion matches or slightly larger than the inner diameter of the attachment bar 210. Having the central conductor 424 and insulator 422 be a separate integrated structure from the attachment bar 210 allows the attachment bar to be constructed of multiple tubular pieces (sections) that are than connected through connector(s) to form a single tubular attachment bar structure.

Although FIG. 10 illustrates the attachment bar 210 as a single piece, element 210 may be composed of multiple sections that can be sequentially joined together during insertion of the high voltage discharge mechanism down into the metal casing. Such an embodiment may be advantageous when the metal casing is long (e.g., greater than 5 meters), such that the attachment bar 210 must extend down by a substantial distance. In such a scenario, the different sections of the attachment bar 210 may be coupled together via intersectional connectors that provide both mechanical and electrical coupling for each the central conductor and the outer conductor of the coaxial conductor pair. These sections may have different length, wall thicknesses, and be construction of different conductive material (e.g., steel, brass, aluminum, etc.).

In addition, the high voltage discharge device 212 itself may be comprised to multiple sections that are sequentially joined together, extending the length of the high voltage discharge device and the electrodes included therein. In such an embodiment, the sections of the high voltage discharge device would be coupled by a connector, referred herein as an inter-electrode connector.

As a result, the invention contemplates several different types of connectors being used in the invented system, connector 432 between the cable 436 and the attachment-bar structure (element), intersectional connector between the different sections of the attachment bar 210; and connector 214 between the attachment-bar structure and the high voltage discharge device 212.

As mentioned above, the wall thickness and the material of the different sections of the attachment bar 210 may vary. For example, the section at the top of the pile-anchor that mechanically attaches to a platform may have a thicker wall and be formed of a stronger material then the section of the attachment bar that is embedded in concrete further down in the metal casing.

Figure 11A:
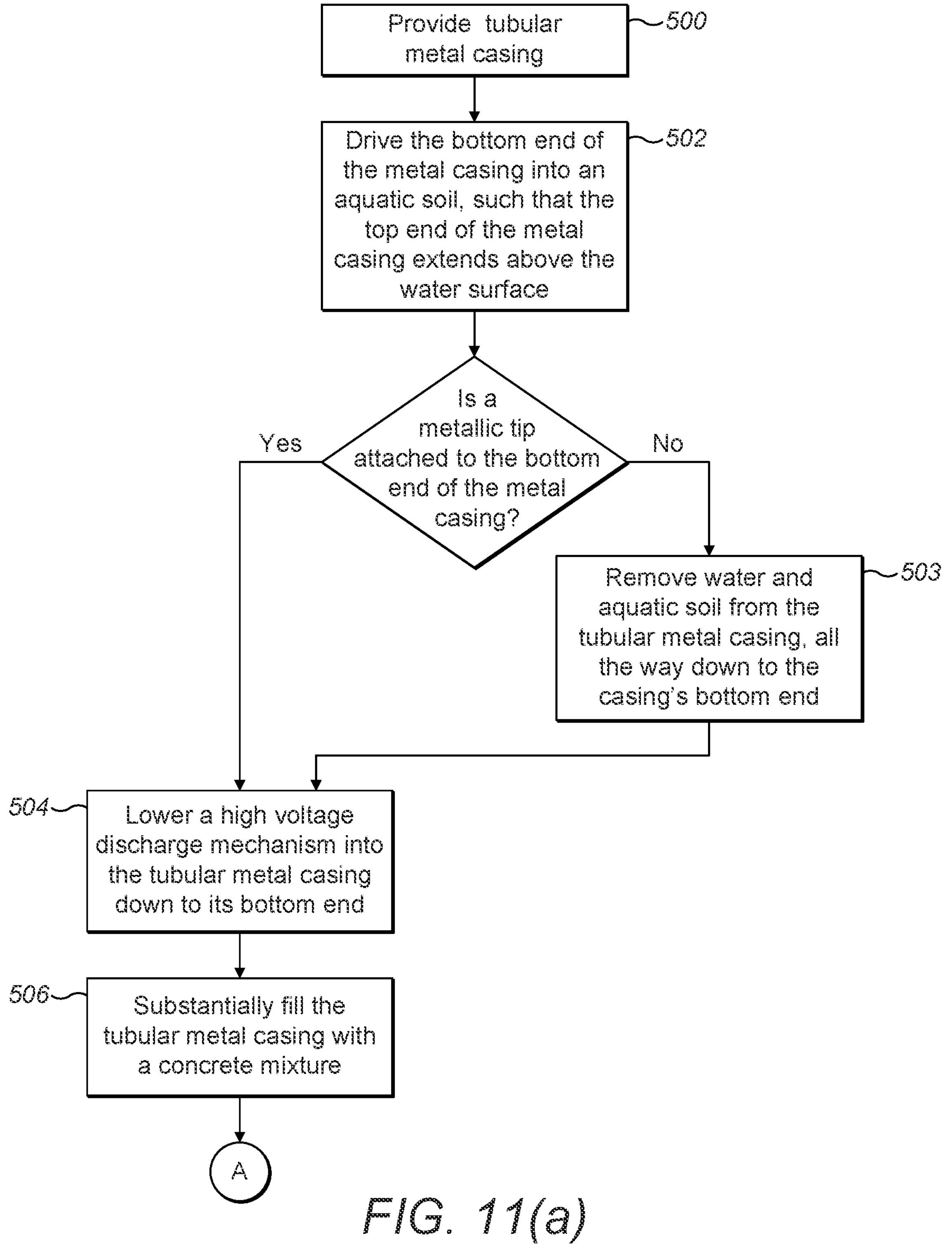
FIGS. 11(*a*) and 11(*b*) show an alternative embodiment of the method for forming a shaped pile-anchor.
Figure 11B:
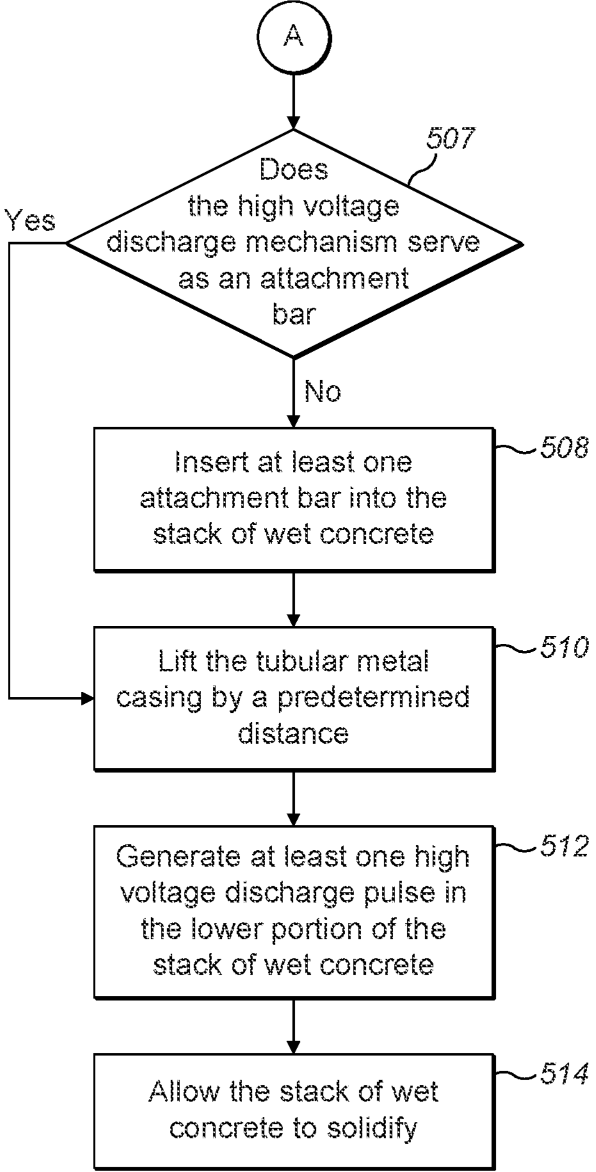

FIGS. 11(*a*) and 11(*b*) shows an alternative embodiment of the method for forming a shaped pile-anchor. Looking at FIG. 11(*a*), the method starts at Step 500 by providing a tubular metal casing. The metal casing has a central axis, a length, a top end, and a bottom end.

Next, at Step 502, the bottom end of the metal casing is driven into an aquatic soil by a predetermined depth, such that the top end of the metal casing extends above the water surface.

Next, a decision is made on whether a metallic tip was detachably coupled to the bottom end of the metal casing. If the answer is "yes," the method proceeds directly to Step 504. If the answer is "no," in which case the interior of the tubular metal casing is now filled with water and aquatic soil, the method proceeds to Step 503.

At Step 503, the water and aquatic soils are removed from the interior of the tubular metal casing. This can be accomplished by pumping out the water and aquatic soil or by any other means known in the art. After completing Step 503, the method would proceed to Step 504.

At step 504, whether entering it directly or after completing Step 503, a high voltage discharge device is lowered into the metallic casing down to the bottom end of the casing. Each electrode of the high voltage discharge device will be connected to its respective electrical conductor that will extend all the way up to, and above, the top end of the metal casing.

Next, at Step 506, the tubular metal casing is substantially filled with a concrete mixture, to create a stack of wet concrete.

In block 507 a decision is made on whether the lowered high voltage discharge mechanism, in particular the outer conductor of the coaxial conductor pair, also serves as an attachment bar. If the answer is "yes," the method proceeds directly to Step 510, in FIG. 11(*b*). Otherwise, i.e., the answer is "no", the method proceeds to Step 508, in FIG. 11(*b*).

At Step 508, at least one attachment bar is inserted into the stack of wet concrete, with the top end of the attachment bar protruding above the top of the stack of wet concrete, and preferably also above the top end of metal casing. It is preferable to have the attachment bars positioned symmetrically with respect to the metal casing's central axis. If a single attachment bar is used, it is preferably positioned along a central axis of the metal casing. In addition. Step 508 may also include fully inserting a metal armature into the stack of wet concrete.

At Step 510, whether arriving there directly from block 507 or via Step 508, the metal casing is lifted by a predetermined distance (height). (If the metallic tip was attached to the bottom end of the metal casing, due to the weight of the stack of wet concrete on the metallic tip, lifting of the casing would detach the metallic tip from the casing.) As a result, lifting of the metal casing exposes a lower portion of the stack of wet concrete, in which the high voltage discharge device is positioned, to the surrounding aquatic soil.

At Step 512, using the high voltage discharge device, at least one high voltage discharge pulse is generated in the lower section of the stack of wet concrete. As explained above, the discharge creates an electric explosion, generating a shock wave that moves, deforms, and compresses the surrounding aquatic soil. When the pressure in the plasma cavity drops, the concrete mixture fills the cavity under gravitation forces, thereby shaping and expanding the footprint of the lower portion of the concrete column. This results in the lower section of the stack of wet concrete having a footprint with a cross-section greater than the cross-section of the upper section of the stack, the latter being surrounded by the metal casing. The discharges are repeated, with the number, frequency, and energy of the pulses being controllable, until the lower portion of the stack is shaped (expanded) sufficiently. This expansion is estimated by the volume of the consumption of the wet concrete at the top of the concrete column (at the top end of the casing). For tubular casings, the consumption volume may be determined by the formula $V=n*\Delta h*\pi*(R_1-R_R)^2$ where "$\Delta h$" is the drop in the height of the stack of wet concrete per each discharge pulse, "n" is the number of pulses. "$R_1$" is the inner radius of the metal casing, and $R_R$—outer radius of the attachment bar. During the shaping process a volume of concrete, which formed the lower portion of the pile-anchor, is added to the top portion of the pile-anchor to fully fill the casing.

Next, at Step 514, the stack of wet concrete is allowed to solidify, thereby forming a concrete column having i) an upper portion surrounded by the metal casing, and ii) a shaped lower portion. The concrete column together with the metal casing and the attachment bar, as well the metallic tip (if present), constitute a shaped pile-anchor.

It should be noted that not all the steps disclosed above may be performed in the described order. For example, the attachment bar and armature can be lowered into the metal casing before it is filled with wet concrete. Similarly, the high voltage discharge device could be lowered down into the metal casing either before or after the casing is substantially filled with wet concrete.

It is also envisioned that the meatal casing could be composed of multiple sections that are joined together during Step 502. Specifically, if the depth by which the casing is driven into the soil is great, Step 502 could be composed of several sequential sub-steps. For example, starting with Sub-step 502(*a*), the bottom end of the first section of the metal casing is driven into the soil such that the top end of the first section of the casing extends above the water surface. Then, at Sub-step 502(*b*), the bottom end of the second section of the metal casing is securely joined with the top end of the first section of the metal casing. Then, in Sub-step 502(*c*), the bottom end of the first section of the metal casing is driven further into the soil, with now only top end of the second section extending above the water surface.

Once all the shaped pile-anchors have been created, they are coupled to a platform via their respective attachment bars. The platform coupled to one of more shaped pile-anchors creates a foundation for structures positioned on it, such as wind-turbines, toll towers, electrical and signal towers, etc.

In one embodiment, an attachment bar has threads at its top end, and the platform is coupled to the pile-anchor by a nut. In another embodiment, coupling is achieved by welding the attachment bar to the platform. The invention is not limited in the way the platform attaches to the pile-anchor, and other known attachment methods are also within the scope of the invention.

The invention also contemplates using spacers between the platform and the pile-anchors to adjust the platform's level. In one preferred embodiment, the platform will be leveled substantially horizontally.

Figure 12:
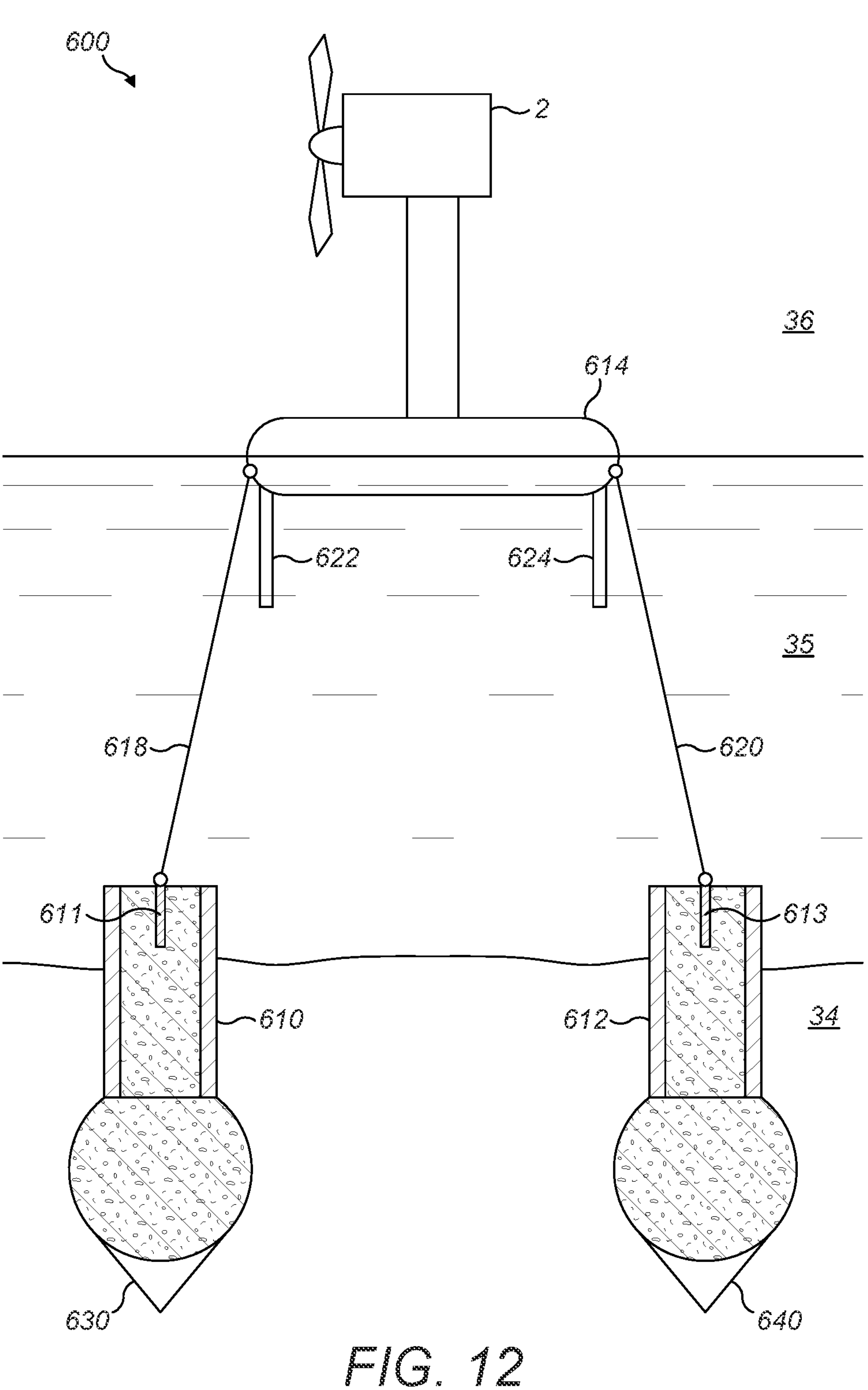
FIG. 12 illustrates an embodiment of an invented aquatic-based foundation system employing a floating platform.

FIG. 12 illustrates an embodiment of the invented aquatic-based foundation system 600 employing a floating platform. In this embodiment, the foundation support system uses one or more shaped pile-anchors that do not extend above the water surface. Instead, a floating platform attaches to, and is held in place by, the shaped pile-anchors under water. For example. FIG. 12 illustrates two shaped pile-anchors 610 and 612 buried in the aquatic soil 34, with the top end of each shaped pile-anchor extending out of the soil into the aquatic medium (water) 35. A platform 614 is shown floating on the surface of the water and is attached by cables (or chains) 618 and 620 to the shaped pile-anchors 610 and 612, through their respective attachment bars 611 and 613. The number of cables extending from each pile-anchor and the cable attachments to the floating platform may wary. A counterbalancing mass, in one embodiment comprising elements 622 and 624, extends down from the bottom surface of the platform 614. Because the shaped pile-anchors 610 and 612 do not support the platform 614 from underneath, but instead only prevent it from moving up and possibly laterally, they operate in anchoring regime only. A wind-turbine structure 2 (or any other supported structure) is attached on top of the platform and is supported by the above-described foundation. The pile-anchors 610 and 612 in FIG. 12 are shown as including the metallic tips 630 and 640, respectively, as described above, the metallic tips may be omitted.

Although the foundation support system in FIG. 12 may be used with any number of shaped pile-anchors, in one preferred embodiment, the system uses a single shaped pile-anchor positioned along the central axis of the platform.

In another embodiment, the shaped anchors are positions off the platform's central axis, but symmetrical to it. This would be like the positioning shown in FIGS. 4(*a*)-4(*c*).

Because the top ends of the pile-anchors 610 and 612 in FIG. 12 are submerged in the aquatic medium (water) 35, the method for forming these pile-anchors differs from the methods for forming the pile-anchors illustrated in FIGS. 3 and 5. For example, to deposit a mixture of wet concrete into the tubular metal casing of the pile-anchor 610 (i.e., the main casing) from above the water surface 35, a detachable casing-extension section may be used. Specifically, the casing-extension section is initially attached to the main casing and is utilized to drive the bottom end of the main casing into the soil, down to a predetermined depth. The top end of the casing-extension would remain above the water level. If the main casing did not have a metallic tip attached to its bottom, equipment would be used to remove the soil, as well as water, from the interior of the main casing. With the interior of the main casing, and of the extension-casing cleaned out, a high voltage discharge device is then lowered to the bottom of the main casing and a concrete mixture is deposited into the main casing, either substantially filling the main casing up to its top end or up to a predetermined percentage of the casing's height. The main casing, together with the casing-extension, would then be lifted by a predetermined height, exposing the bottom portion of the stack of wet concrete to the surrounding soil. (If the main casing had a metallic tip attached to its bottom end, the weight of wet concrete would cause the metallic tip to detach from the main casing during lifting.) One or more high voltage discharges would then be generated to shape the bottom portion of the stack of wet concrete. Once the bottom portion of the stack of wet concrete has been shaped, the high voltage discharge device may be removed from the stack of wet concrete, and a cable-attachment bar is then inserted into the stack, with the top end of the cable-attachment bar extending above the stack. The shape of the top end of cable-attachment bar may vary depending on the type of attachment to the cable. In one embodiment, the top end could be threaded. In another embodiment, the top end could be in the shape of a loop, for a loop to cable-hook attachment. In yet another embodiment, the top end could be in the shape of a hook, for a hook to cable-loop attachment. In addition to the cable-attachment bar, armature could also be inserted into the stack of wet concrete, before or after shaping.

Once the pile-anchor has been shaped and the cable-attachment bar, as well as the armature, has been installed, the casing-extension is disconnected from the main casing and removed, and the stack of wet concrete is allowed to solidify (harden) under water.

While the foregoing descriptions may disclose specific values, unless expressly stated otherwise, other specific values may be used to achieve similar results. Further, the various features of the foregoing embodiments may be selected and combined to produce numerous variations of improved systems.

In the foregoing specification, exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings, and therefore the scope of the invention is to be limited only by the claims.

Moreover, in this document, relational terms such as first and second, and the like may be used solely to distinguish one entity or action from another entity or action without necessarily requiring or implying any actual relationship or order between such entities or actions. The terms "comprise(s)". "comprising". "has", "having", "includes". "including", "contains", "containing" or any other variation thereof, are intended to cover a non-exclusive inclusion, such that a process, method, article, or apparatus that comprises, has, includes or contains a list of elements does not include only those elements but may include other elements not expressly listed or inherent to such process, method, article, or apparatus. An element preceded by "comprises . . . a", "has . . . a", "includes . . . a" or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A method of forming a pile-anchor comprising the steps of:

providing a metal casing having a central axis, a length, a top end, and a bottom end;

driving the bottom end of the metal casing into a soil, such that the top end of the metal casing extends above surface;

substantially filling the metal casing with a concrete mixture to create a stack of wet concrete;

inserting an at least one attachment bar into the metal casing, the at least one attachment bar having a top end protruding above the top end of the metal casing;

lifting the metal casing by a predetermined height within a bore hole, thereby exposing a lower portion of the stack of wet concrete to a surrounding soil;

generating an at least one local high-pressure spike in the lower portion of the stack of wet concrete to compress the surrounding soil and to allow the concrete mixture to fill in a resulting space, thereby causing the lower portion of the stack of wet concrete to have a zone with a cross-section that is greater than a cross-section of the stack of wet concrete within the metal casing;

depositing an additional amount of the concrete mixture into the metal casing to compensate for a drop in a level of the stack of wet concrete following the at least one local high-pressure spike; and allowing the stack of wet concrete to solidify, thereby forming a concrete column having an upper portion within the metal casing and a shaped lower portion.

2. The method of claim 1, wherein the at least one local high-pressure spike is created by an at least one high voltage discharge pulse from an at least one high voltage discharge device.

3. The method of claim 1, further comprising the step of inserting an at least one high voltage discharge device down the metal casing.

4. The method of claim 3, wherein the step of inserting an at least one attachment bar into the metal casing comprises inserting a first attachment bar down the metal casing along the central axis, wherein the at least one high voltage discharge device comprises a first high voltage discharge device coupled to a bottom end of the first attachment bar, such that the step of inserting the at least one high voltage discharge device down the metal casing comprises inserting the first high voltage discharge device down the metal casing, and whereby the step of inserting the first attachment bar down the metal casing along the central axis is contemporaneous with the step of inserting the first high voltage discharge device down the metal casing.

5. The method of claim 4, wherein the first attachment bar has a tubular metal body forming an outer conductor of a coaxial pair of conductors that are electrically insulated from each other, with the other conductor in the coaxial pair of conductors constituting an inner conductor, wherein the outer and inner conductors are configured to conduct an at least one high voltage discharge pulse for generating the at least one local high-pressure spike in the lower portion of the stack of wet concrete, wherein the first high voltage discharge device includes a first electrode and a second electrode, and wherein the first electrode is electrically coupled to the outer conductor and the second electrode is electrically coupled to the inner conductor.

6. The method of claim 3, wherein the step of inserting an at least one attachment bar into the metal casing comprises inserting a second attachment bar and inserting a third attachment bar, the second and third attachment bars being positioned symmetrically with respect to the central axis, and wherein the at least one high voltage discharge device comprises a third high voltage discharge device coupled to a bottom end of the third attachment bar and a second high voltage discharge device coupled to a bottom end of the second attachment bar.

7. The method of claim 6, wherein the second attachment bar has a tubular metal body forming an outer conductor of a second coaxial pair of conductors that are electrically insulated from each other, with the other conductor of the second coaxial pair of conductors constituting an inner conductor of the second coaxial pair of conductors, wherein the third attachment bar has a tubular metal body forming an outer conductor of a third coaxial pair of conductors that are electrically insulated from each other, with the other conductor of the third coaxial pair of conductors constituting an inner conductor of the third coaxial pair of conductors, and wherein the second coaxial pair of conductors and the third coaxial pair of conductors are configured to conduct an at least one high voltage discharge pulse for shaping of the lower portion of the stack of wet concrete, wherein each of the second high voltage discharge device and the third high voltage discharge device comprises a respective first electrode and a respective second electrode, wherein the first electrode of the second high voltage discharge device is electrically coupled to the outer conductor of the second coaxial pair of conductors;

wherein the second electrode of the second high voltage discharge device is electrically coupled to the inner conductor of the second coaxial pair of conductors;

wherein the first electrode of the third high voltage discharge device is electrically coupled to the outer conductor of the third coaxial pair of conductors; and wherein the second electrode of the third high voltage discharge device is electrically coupled to the inner conductor of the third coaxial pair of conductors.

8. The method of claim 1, wherein the concrete column is configured to support is a wind turbine.

9. A pile-anchor comprising:

i) a metal casing having a central axis, a top end, and a bottom end, the bottom end located in a soil and the top end protruding above a soil surface;

ii) a concrete column comprising an upper portion and a shaped lower portion, the upper portion filling the metal casing and extending from approximately the top end of the metal casing down to the bottom end of the metal casing, and the shaped lower portion extending below the bottom end of the metal casing further down into the soil and having a cross-section that is greater than a cross-section of the upper portion, the shaped lower portion providing the pile-anchor with an increased load bearing and anchoring capacity; and iii) an at least one attachment bar embedded at least into the upper portion of the concrete column, the at least one attachment bar having a top end protruding above the upper portion of the concrete column;

wherein the shaped lower portion of the concrete column comprises a high voltage discharge device embedded therein, the high voltage discharge device having a first electrode and a second electrode, wherein the first electrode is electrically coupled to a first conductor and the second electrode is electrically coupled to a second conductor, wherein the first conductor and the second conductor are electrically isolated from each other, wherein the first and second conductors extend upward within the upper portion of the concrete column, and wherein the at least one attachment bar comprises a first attachment bar having a tubular metal body, the first attachment bar extending down into the shaped lower portion of the concrete column along the central axis of the metal casing and coupled to the high voltage discharge device.

10. The pile-anchor of claim 9, wherein the pile-anchor comprises a plurality of pile-anchors positioned in a symmetrical configuration.

11. The pile-anchor of claim 9, wherein the first conductor and the second conductor are coaxial.

12. The pile-anchor of claim 11, wherein the first conductor is an outer conductor and the second conductor is an inner conductor;

wherein the tubular metal body of the first attachment bar forms the outer conductor.

13. The pile-anchor of claim 9, wherein the first and second conductors pass within the tubular metal body of the first attachment bar.

14. The pile-anchor of claim 9, wherein the at least one attachment bar further comprises a second attachment bar and a third attachment bar, the second and third attachment bars positioned symmetrically about the central axis of the metal casing, each of the second and third attachment bars having a top end protruding above the upper portion of the concrete column, and each of the second and third attachment bars extending down into the shaped lower portion of the concrete column.

15. The pile-anchor of claim 14, wherein the high voltage discharge device includes a first high voltage discharge device and a second high voltage discharge device.

16. The pile-anchor of claim 9, configured to support a wind-turbine.

* * * * *